(12) United States Patent
Tunis, III et al.

(10) Patent No.: US 11,041,697 B2
(45) Date of Patent: Jun. 22, 2021

(54) SOFT BALLISTIC RESISTANT ARMOR

(71) Applicants: Hardwire, LLC, Pocomoke City, MD (US); George C. Tunis, III, Pocomoke City, MD (US)

(72) Inventors: George C. Tunis, III, Ocean City, MD (US); Benjamin J. Kremer, Snow Hill, MD (US)

(73) Assignee: Hardwire, LLC, Pocomoke City, MD (US)

( * ) Notice: Subject to any disclaimer, the term of this patent is extended or adjusted under 35 U.S.C. 154(b) by 286 days.

(21) Appl. No.: 15/523,445

(22) PCT Filed: Sep. 9, 2015

(86) PCT No.: PCT/US2015/049076
§ 371 (c)(1),
(2) Date: May 1, 2017

(87) PCT Pub. No.: WO2016/069118
PCT Pub. Date: May 6, 2016

(65) Prior Publication Data
US 2017/0314894 A1 Nov. 2, 2017

Related U.S. Application Data

(60) Provisional application No. 62/073,293, filed on Oct. 31, 2014.

(51) Int. Cl.
*F41H 5/04* (2006.01)
*B32B 5/02* (2006.01)
*B32B 5/16* (2006.01)
*B32B 5/26* (2006.01)
*B32B 5/30* (2006.01)
*B32B 7/08* (2019.01)
(Continued)

(52) U.S. Cl.
CPC .............. *F41H 5/0478* (2013.01); *A42B 3/04* (2013.01); *A42B 3/08* (2013.01); *A42B 3/16* (2013.01);
(Continued)

(58) Field of Classification Search
CPC ..... F41H 5/04; F41H 5/02; F41H 1/02; F41H 1/04; F41H 7/02; B05D 5/08; B32B 5/26;
(Continued)

(56) References Cited

U.S. PATENT DOCUMENTS

| 5,175,040 A | 12/1992 | Harpell et al. |
| 5,581,932 A | 12/1996 | Bell |

(Continued)

FOREIGN PATENT DOCUMENTS

| EP | 0200547 A2 | 11/1986 |
| EP | 0472114 A2 | 2/1992 |
| GB | 2042414 A | 9/1980 |
| JP | 2002-194616 A | 7/2002 |

(Continued)

OTHER PUBLICATIONS

DSM Product Specification Sheet BT10, (2009).
(Continued)

*Primary Examiner* — Arti Singh-Pandey
(74) *Attorney, Agent, or Firm* — Verrill Dana, LLP

(57) ABSTRACT

A soft armor panel is provided by work softening a panel formed of a ballistic material. The panel also includes slip planes between adjacent ply groups, the adjacent ply groups remaining unconnected or substantially unconnected at the slip plane. The soft, or conformable, body armor, is resistant to various projectile threats, in which the panel is made by work-softening an otherwise rigid panel. The soft armor panel includes a work softened lamination of a plurality of ply groups. Each ply group comprises one or more layers, each layer comprising a composite material of fibers embedded in a matrix material. A slip plane is disposed between at least one set of adjacent ply groups, such that the adjacent ply groups remain unconnected or substantially unconnected at the slip plane. The softened ballistic panel retains significant ballistic properties, is light weight and can be readily conformed to various torso configurations.

28 Claims, 22 Drawing Sheets a) Panel feeding in at a 45° orientation angle.

b) -45° Panel Orientation

(51) Int. Cl.

| | |
|---|---|
| *B32B 7/12* | (2006.01) |
| *B32B 9/00* | (2006.01) |
| *B32B 9/04* | (2006.01) |
| *B32B 15/14* | (2006.01) |
| *B32B 27/12* | (2006.01) |
| *B32B 27/32* | (2006.01) |
| *B32B 27/40* | (2006.01) |
| *B32B 29/02* | (2006.01) |
| *B32B 5/22* | (2006.01) |
| *B32B 5/12* | (2006.01) |
| *B32B 7/02* | (2019.01) |
| *B32B 27/36* | (2006.01) |
| *A42B 3/04* | (2006.01) |
| *A42B 3/08* | (2006.01) |
| *A42B 3/16* | (2006.01) |
| *A42B 3/20* | (2006.01) |
| *A43B 7/32* | (2006.01) |
| *A45F 3/04* | (2006.01) |
| *A63B 71/08* | (2006.01) |
| *A63B 71/12* | (2006.01) |

(52) U.S. Cl.
CPC ............... *A42B 3/20* (2013.01); *A42B 3/205* (2013.01); *A43B 7/32* (2013.01); *A45F 3/04* (2013.01); *A63B 71/085* (2013.01); *A63B 71/12* (2013.01); *A63B 71/1225* (2013.01); *B32B 5/022* (2013.01); *B32B 5/024* (2013.01); *B32B 5/026* (2013.01); *B32B 5/12* (2013.01); *B32B 5/16* (2013.01); *B32B 5/22* (2013.01); *B32B 5/26* (2013.01); *B32B 5/30* (2013.01); *B32B 7/02* (2013.01); *B32B 7/08* (2013.01); *B32B 7/12* (2013.01); *B32B 9/007* (2013.01); *B32B 9/047* (2013.01); *B32B 15/14* (2013.01); *B32B 27/12* (2013.01); *B32B 27/32* (2013.01); *B32B 27/36* (2013.01); *B32B 27/365* (2013.01); *B32B 27/40* (2013.01); *B32B 29/02* (2013.01); *A63B 2071/1258* (2013.01); *B32B 2255/02* (2013.01); *B32B 2255/10* (2013.01); *B32B 2255/12* (2013.01); *B32B 2255/20* (2013.01); *B32B 2255/26* (2013.01); *B32B 2260/023* (2013.01); *B32B 2260/046* (2013.01); *B32B 2260/048* (2013.01); *B32B 2262/02* (2013.01); *B32B 2262/0253* (2013.01); *B32B 2262/0269* (2013.01); *B32B 2262/101* (2013.01); *B32B 2264/105* (2013.01); *B32B 2264/107* (2013.01); *B32B 2264/108* (2013.01); *B32B 2307/746* (2013.01); *B32B 2571/02* (2013.01); *B32B 2605/00* (2013.01)

(58) Field of Classification Search
CPC ......... B32B 15/14; B32B 27/12; B32B 27/32; B32B 27/36; B32B 27/40; B32B 29/02; B32B 5/02; B32B 5/12; B32B 5/16; B32B 5/30; B32B 7/04; B32B 7/08; B32B 7/12; B32B 9/00; B32B 9/04; B32B 5/22; A42B 3/04; A42B 3/08; A42B 3/16; A42B 3/20; A43B 7/32; A45F 3/04; A63B 71/08; A63B 71/12; A41D 13/015
See application file for complete search history.

(56) References Cited

U.S. PATENT DOCUMENTS

| | | |
|---|---|---|
| 5,789,327 A | 8/1998 | Rousseau |
| 5,804,015 A | 9/1998 | McCarter et al. |
| 5,851,932 A | 12/1998 | Dickson et al. |
| 5,873,973 A | 2/1999 | Koon et al. |
| 6,000,055 A | 12/1999 | Citterio |
| 6,276,255 B1 | 8/2001 | Field et al. |
| 6,526,862 B1 | 3/2003 | Lyons |
| 6,703,104 B1 | 3/2004 | Neal |
| 6,709,995 B1 | 3/2004 | Dyksterhouse |
| 6,945,155 B2 | 9/2005 | Cordova et al. |
| 7,211,291 B2 | 5/2007 | Harpell et al. |
| 7,601,416 B2 | 10/2009 | Palley |
| 7,863,205 B2 | 1/2011 | Stewart et al. |
| 7,981,495 B2 | 7/2011 | Kim et al. |
| 8,017,529 B1 | 9/2011 | Arvidson et al. |
| 8,080,486 B1 | 12/2011 | Bhatnagar et al. |
| 8,278,757 B2 | 10/2012 | Crain et al. |
| 8,375,839 B2 | 2/2013 | Landi |
| 8,381,623 B2 | 2/2013 | Chu et al. |
| 8,381,632 B1 | 2/2013 | Chu et al. |
| 8,490,213 B2 | 7/2013 | Neal |
| 8,534,178 B2 | 9/2013 | Howland et al. |
| 8,617,680 B2 | 12/2013 | Geva et al. |
| 8,667,879 B2 | 3/2014 | Kidd et al. |
| 8,776,662 B1 | 7/2014 | Hoenes |
| 8,904,915 B2 | 12/2014 | Howland |
| 8,906,484 B1 | 12/2014 | Black, Jr. et al. |
| 8,956,985 B2 | 2/2015 | Lampo et al. |
| 2005/0003160 A1 | 1/2005 | Chen et al. |
| 2008/0146108 A1 | 6/2008 | Singletary et al. |
| 2009/0004413 A1 | 1/2009 | Wagner et al. |
| 2009/0025111 A1 | 1/2009 | Bhatnagar et al. |
| 2009/0255022 A1 | 10/2009 | Smith |
| 2011/0023202 A1 | 2/2011 | Vanarsdalen et al. |
| 2011/0023697 A1 | 2/2011 | Howland |
| 2011/0219943 A1 | 9/2011 | Arvidson et al. |
| 2012/0052222 A1 | 3/2012 | Gagne |
| 2012/0152098 A1 | 6/2012 | Howland et al. |
| 2012/0192339 A1 | 8/2012 | Bhatnagar et al. |
| 2012/0295057 A1 | 11/2012 | Atorrasagasti |
| 2012/0312151 A1 | 12/2012 | Patel |
| 2013/0319214 A1 | 12/2013 | Kopan |
| 2014/0065911 A1 | 3/2014 | Schmidt et al. |
| 2014/0250555 A1 | 9/2014 | Carlson |

FOREIGN PATENT DOCUMENTS

| | | |
|---|---|---|
| JP | 2010-210201 A | 9/2010 |
| JP | 2010532720 A | 10/2010 |
| JP | 2011-514500 A | 5/2011 |
| WO | 2004/039565 A1 | 5/2004 |
| WO | 2005/066400 A1 | 7/2005 |
| WO | 2007/122009 A1 | 11/2007 |
| WO | 2008/063682 A1 | 5/2008 |
| WO | 2008/077605 A1 | 7/2008 |
| WO | 2009/056287 A1 | 5/2009 |
| WO | 2009/091432 A1 | 7/2009 |
| WO | 2012/080274 A1 | 6/2012 |
| WO | 2014/204522 A1 | 12/2014 |

OTHER PUBLICATIONS

DSM Product Specification Sheet HB50, (2014).
DSM Product Specification Sheet HB26, (2014).
National Institute of Justice, "Ballistic Resistance of Body Armor", Jul. 2008.
DSM Product Specification Sheet HB212, (2014).
DSM Product Specification Sheet HB25, (2014).
DSM Product Specification Sheet HB2, (2014).
Phoenix, S.L. et al., "Modeling and Experiments on Ballistic Impact into UHMWPE Yarns Using Flat and Saddle-Nosed Projectiles", Fiber, (2017), vol. 5, No. 8, 41 pgs.

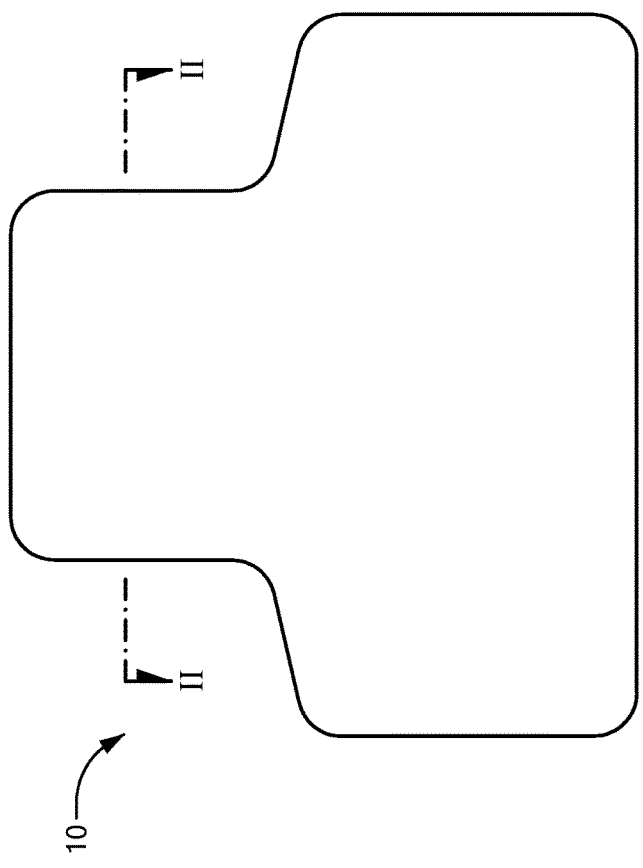
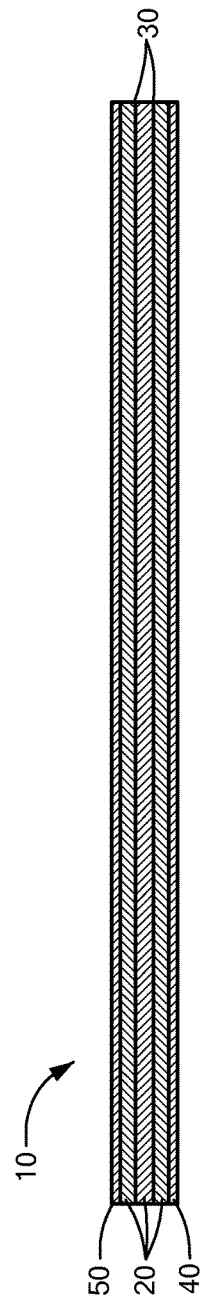

Front view, panel in rollers

Isometric view, panel

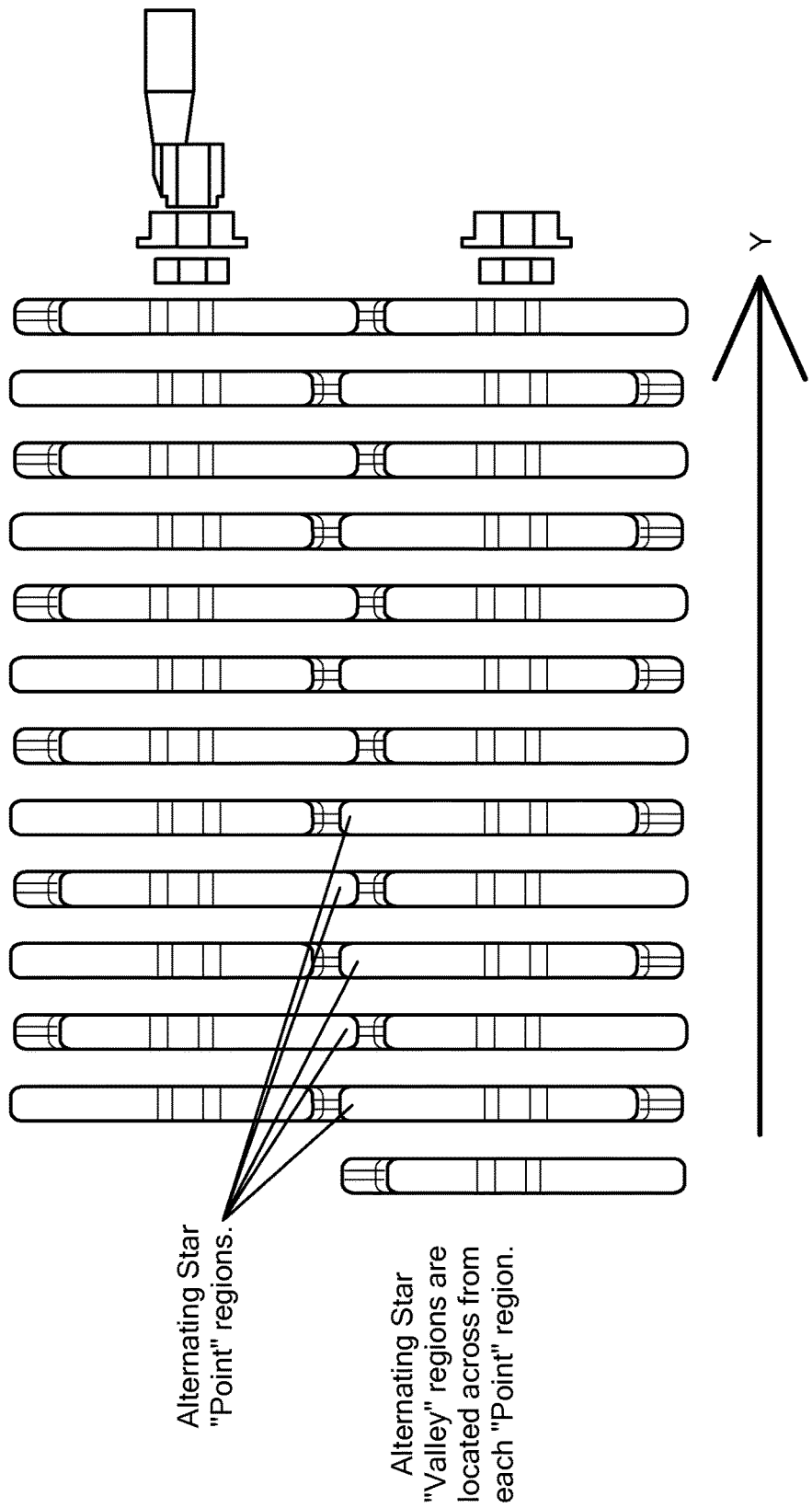

15" x 15" shootpack after 17-grain FSP testing

15" x 15" shootpack after JP-8 conditioning and 9mm FMJ testing

NIJ-C-1-Smallest Panel after .357-Mag testing

NIJ-C-1-Smallest Panel after JP-8 conditioning and .357-Mag testing

Front                Back

NIJ-C-1-Smallest Panel after .357-Sig testing

Front                Back

NIJ-C-1-Smallest Panel after JP-8 conditioning and .357-Sig testing

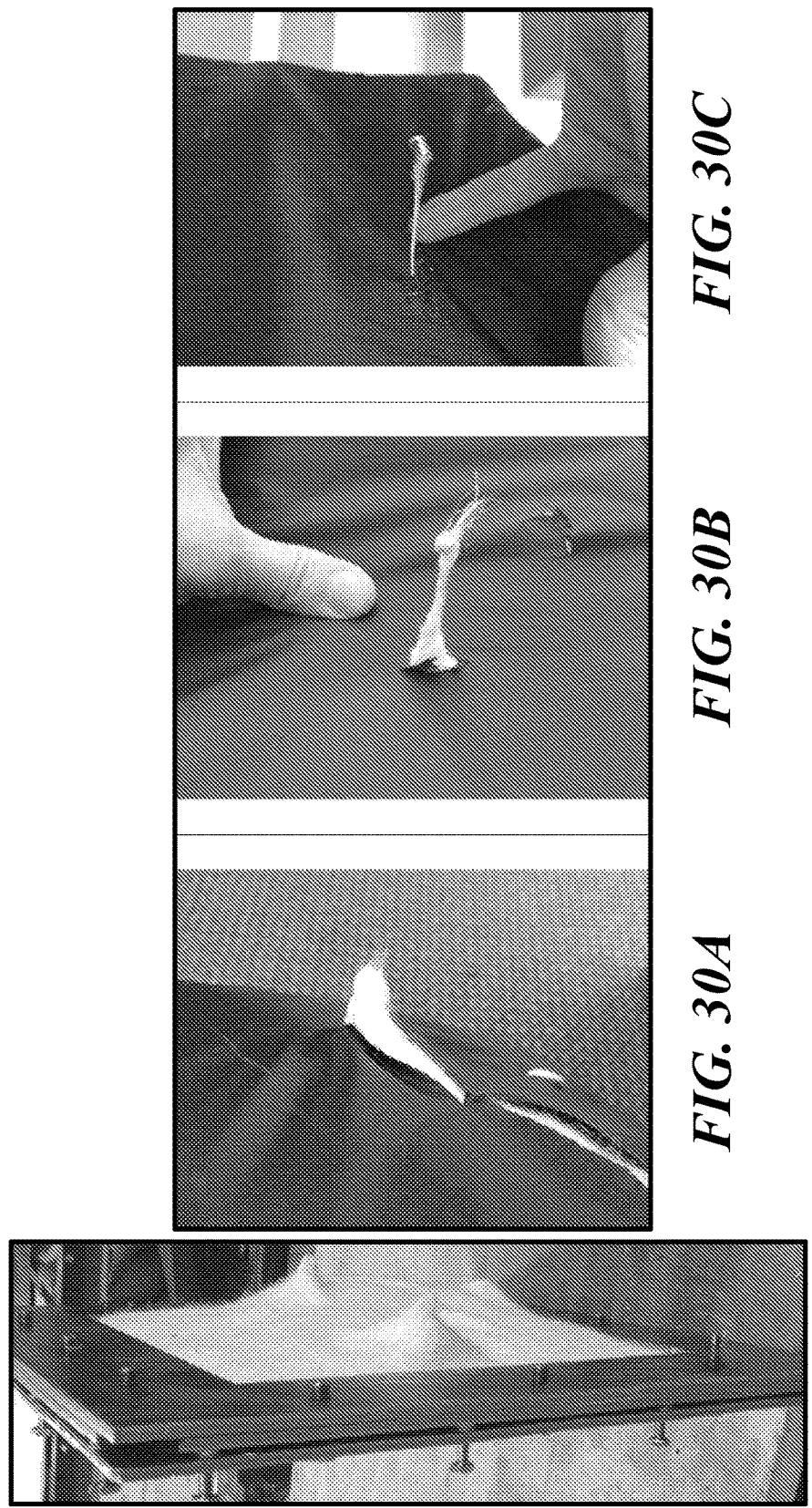

SOFT BALLISTIC RESISTANT ARMOR

CROSS REFERENCE TO RELATED APPLICATIONS

This application claims priority under 35 § 119(e) of U.S. Provisional Application No. 62/073,293 filed on Oct. 31, 2014, entitled "Soft Body Armor," the disclosure of which is hereby incorporated by reference.

STATEMENT REGARDING FEDERALLY SPONSORED RESEARCH OR DEVELOPMENT

N/A

BACKGROUND

Conventional soft body armor (e.g. soft bullet resistant vests) is an assembly of soft materials, such as high strength fibers and the cloths woven from high strength fibers, combined through stitching and bonding with conventional textile means. Composite materials incorporating fiber in a resin matrix have been difficult to use in conventional soft body armor, as such composite materials are rigid and are not conformable to the human body.

SUMMARY OF THE INVENTION

The invention relates to soft, or conformable, body armor, resistant to various projectile threats, in which the panel is made by work-softening an otherwise rigid panel. The soft armor panel includes a work softened lamination of a plurality of ply groups. Each ply group comprises one or more layers, each layer comprising a composite material of fibers embedded in a matrix material. A slip plane is disposed between at least one set of adjacent ply groups, such that the adjacent ply groups remain unconnected or substantially unconnected at the slip plane. The softened ballistic panel retains significant ballistic properties, is light weight and can be readily conformed to various torso configurations.

Other aspects of the soft ballistic resistant armor include the following:

1. A soft panel comprising:
   a work softened lamination comprising a plurality of ply groups, each ply group comprising one or more layers, each layer comprising a composite material comprising fibers embedded in a matrix material; and
   a slip plane between at least one set of adjacent ply groups, the adjacent ply groups remaining unconnected or substantially unconnected at the slip plane.
2. The soft panel of item 1, wherein the slip plane comprises a slip agent between the adjacent ply groups.
3. The soft panel of item 2, wherein the slip agent is bonded on or embedded into a surface of one or both of the adjacent ply groups.
4. The soft panel of any of items 2-3, wherein the slip agent comprises graphene.
5. The soft panel of item 4, wherein the graphene is provided in a layer having a thickness ranging from 0.0001 to 0.002 inch.
6. The soft panel of any of items 1-5, wherein the slip plane comprises graphene particles, graphene-based ink, ceramic particles, metal particles, a plastic film, a metallic film, paper, or a combination thereof.
7. The soft panel of any of items 1-6, wherein the slip plane comprises a silicone-coated paper or a silicone-coated film.
8. The soft panel of any of items 1-7, wherein the slip plane comprises a film of high density polyethylene or polyethylene terephthalate.
9. The soft panel of any of items 1-8, wherein the slip plane comprises a discontinuity within the lamination, the discontinuity formed by two resins disposed in adjacent ply groups, wherein the two resins do not bond with each other.
10. The soft panel of any of items 1-9, wherein the slip plane comprises a discontinuity within the lamination, the discontinuity formed by a change in angle of orientation of the fibers between adjacent ply groups.
11. The soft panel of any of items 1-10, wherein the adjacent ply groups are held together at the slip plane during normal use and move in shear relative to one another along the slip plan during a ballistic event.
12. The soft panel of any of items 1-11, wherein the slip plane further includes an adhesive material or a fastening mechanism to hold the adjacent ply groups together during normal use and allow movement of the adjacent ply groups in shear relative to one another along the slip plane during a ballistic event.
13. The soft panel of any of items 1-12, wherein the work softened lamination includes a plurality of defects within at least a portion of the ply groups, the defects comprising one or more of disbond defects and delamination defects between the fibers within the ply group.
14. The soft panel of any of items 1-13, further comprising a felt layer disposed on a back face of the lamination.
15. The soft panel of item 14, wherein the felt layer comprises dry fibers of an ultrahigh molecular weight polyethylene.
16. The soft panel of any of items 1-15, further comprising a felt layer disposed as a strike face adjacent to a first ply group.
17. The soft panel of item 16, wherein the felt layer comprises dry fibers of an ultrahigh molecular weight polyethylene.
18. The soft panel of any of items 1-17, further comprising a layer of foam adjacent to one of the plurality of ply groups.
19. The soft panel of item 18, wherein the foam comprises a polyethylene, polyvinyl chloride, styrene acrylonitrile, or polyurethane.
20. The soft panel of any of items 1-19, further comprising a layer of metal foil disposed adjacent to one of the plurality of ply groups.
21. The soft panel of item 20, wherein the metal foil comprises aluminum.
22. The soft panel of any of items 1-21, further comprising a layer of film adjacent to one of the plurality of ply groups, the film comprising a material having a processing temperature lower than a melt temperature of the composite material.
23. The soft panel of item 22, wherein the layer of film comprises a polyethylene, polypropylene, urethane, thermoplastic or thermoset material.
24. The soft panel of any of items 1-23, wherein each layer within at least a portion of the ply groups comprises a prepreg material comprising one or more plies of the fibers pre-impregnated with the matrix material.
25. The soft panel of any of items 1-24, wherein each layer within at least a portion of the ply groups comprises a prepreg material comprising two or more plies of the fibers pre-impregnated with the matrix material.
26. The soft panel of any of items 1-25, wherein in a ply group, the fibers within the layers are unidirectionally aligned and the fiber direction in adjacent layers are cross-plied at an angle ranging from more than 0° to 90°.

27. The soft panel of any of items 1-26, wherein the fibers within the layers in each ply group are cross-plied at right angles.

28. The soft panel of any of items 1-27, wherein fibers in adjacent layers in a first ply group are oriented in a 0°/90° configuration and fibers in adjacent layers in a second ply group are oriented in a 0°/90° configuration, while the second ply group is rotated at an angle between 30° to 60° with respect to the first ply group.

29. The soft panel of any of items 1-28, wherein the cross-plied fibers in the second ply group are arranged in a +45°/−45° configuration with respect to the first ply group.

30. The soft panel of items 1-29, wherein cross-plied fibers in a third ply group adjacent to the second ply group are oriented in the 0°/90° configuration.

31. The soft panel of any of items 1-30, wherein the fibers in at least one of the layers are unidirectionally oriented.

32. The soft panel of any of items 1-30 wherein the fibers in at least one of the layers are oriented at different angles.

33. The soft panel of any of items 1-32, wherein the plurality of ply groups comprise at least a first ply group, a second ply group, and a third ply group, the second ply group disposed between the first ply group and the third ply group, the second ply group having an areal density greater than areal densities of the first ply group and the third ply group.

34. The soft panel of any of items 1-33, wherein each of the ply groups has an areal density ranging from 0.01 to 1.0 lb/ft$^2$.

35. The soft panel of any of items 1-34, wherein the areal density of at least one of the ply groups ranges from 0.01 to 0.25 lb/ft$^2$.

36. The soft panel of any of items 1-35, wherein the work softened lamination has a thickness ranging from 0.01 to 0.5 inch.

37. The soft panel of any of items 1-36, wherein the work softened lamination has an areal density less than 0.80 lb/ft$^2$.

38. The soft panel of any of items 1-37, wherein the work softened lamination has an areal density less than 0.75 lb/ft$^2$.

39. The soft panel of any of items 1-38, wherein each of the layers of each ply group comprise one of a woven material, a non-woven material, a unidirectional material, a knit material, or a felt material.

40. The soft panel of any of items 1-39, wherein each of the layers of each ply group comprise a material of unidirectional fibers.

41. The soft panel of any of items 1-40, wherein the unidirectional fibers comprise ultra-high molecular weight polyethylene fibers.

42. The soft panel of any of items 1-41, wherein the fibers include filaments, tow fibers, staple fibers, yarn, or tape.

43. The soft panel of any of items 1-42 where the fibers include yarn comprising two or more materials.

44. The soft panel of any of items 1-43, wherein the work softened lamination further comprises at least one layer of dry fibers between ply groups.

45. The soft panel of item 44, wherein the dry fibers comprise a woven material, a non-woven material, a felt, a unidirectional material, or a knit.

46. The soft panel of any of items 1-45 wherein the composite material comprises ultra-high molecular weight polyethylene fibers in a urethane resin matrix.

47. The soft panel of any of items 1-45, wherein the fibers of the composite material comprise ultra-high molecular weight polyethylene fibers, aramid fibers, glass fibers, liquid crystal polymer fibers, or polybenzoxazole fibers.

48. The soft panel of any of items 1-47, wherein the matrix material comprises a thermosetting resin or a thermoplastic resin.

49. The soft panel of item 48, wherein the thermosetting resin comprises a urethane resin, an epoxy resin, or a polyester resin.

50. The soft panel of item 48, wherein the thermoplastic resin comprises a urethane, a polypropylene, a nylon, a low molecular weight polyethylene, a polystyrene, a styrene butadiene block copolymer, a styrene isoprene block copolymer, or combinations thereof.

51. The soft panel of any of items 1-50, wherein the matrix material comprises a thermosetting rubber or a thermoplastic rubber.

52. The soft panel of any of items 1-51, wherein the composite material comprises a ballistic material.

53. The soft panel of any of items 1-52, wherein the composite material comprises a ballistic material comprising ultra high molecular weight polyethylene fibers embedded in a resin matrix.

54. The soft panel of any of items 1-53, wherein the composite material comprises ultra high molecular weight polyethylene fibers embedded in a resin matrix.

55. The soft panel of any of items 1-54, further comprising a fastening mechanism disposed to hold the work softened lamination together during normal usage while allowing slippage during ballistic events.

56. The soft panel of item 55, wherein the fastening mechanism comprises tape, a rivet, a screw, a staple, stitching, adhesive, a hook and loop fastener, or a combination thereof.

57. The soft panel of any of items 1-56, wherein a softness test load on the panel is less than 75 lbs. as determined by a Ball Plunger test.

58. The soft panel of any of items 1-57, further comprising an enclosure surrounding the work softened lamination.

59. The soft panel of item 58, wherein the enclosure is vacuum fitted to the lamination.

60. The soft panel of any of items 1-59, wherein the work softened lamination has a contoured configuration.

61. The soft panel of item 60, wherein the contoured configuration comprises a contour to fit a human body torso.

62. The soft panel of any of items 59-60, wherein the contoured configuration comprises a contour to fit a human female torso or a human male torso.

63. The soft panel of any of items 1-62, wherein the work softened lamination further comprises at least one layer of flocking between layers of the composite material.

64. The soft panel of any of items 1-63, wherein the work softened lamination comprises:
  a first ply group comprising a strike face, the layers of the first ply group each formed from a prepreg having an areal density ranging from 131 to 141 g/m$^2$;
  a second ply group, the layers of the second ply group each formed from a prepreg having an areal density ranging from 226 to 240 g/m$^2$;
  a third ply group, the layers of the third ply group each formed from a prepreg having an areal density ranging from 131 to 141 g/m$^2$.

65. The soft panel of item 64, wherein the first ply group comprises between 2 and 14 layers, the second ply group comprises between 3 and 12 layers, and the third ply group comprises between 2 and 14 layers.

66. The soft panel of any of items 64-65, wherein the first ply group comprises eight layers, the second ply group comprises five layers, and the third ply group comprises eight layers.

67. The soft panel of any of items 64-66, wherein the slip plane between at least one set of adjacent ply groups comprises a first layer of graphene particles or graphene-based ink between the first ply group and the second ply group, and a second layer of graphene particles or graphene-based ink between the second ply group and the third ply group.

68. The soft panel of any of items 64-67, wherein the fibers within the layers in each ply group are cross-plied at right angles.

69. The soft panel of any of items 64-68, wherein:
cross-plied fibers in the first ply group are oriented in a 0°/90° configuration;
cross-plied fibers in the second ply group are oriented in a +45°/−45° configuration with respect to the first ply group; and
cross-plied fibers in the third group are oriented in the 0°/90° configuration.

70. The soft panel of any of items 64-69, further comprising a layer of a polyethylene foam disposed between the first ply group and the second ply group.

71. The soft panel of any of items 64-70, further comprising a layer of a dry felt material disposed as a strike face adjacent to the first ply group.

72. The soft panel of any of items 64-71, further comprising at least one layer of dry felt disposed as a backing layer adjacent to the third ply group.

73. The soft panel of any of items 64-72 further comprising two layers of dry felt disposed as a backing layer adjacent to the third play group.

74. The soft panel of any of items 1-63, wherein the lamination comprises:
a first ply group comprising or adjacent to a strike face, wherein the layers of the first ply group are cross-plied at right angles and oriented in a 0°/90° configuration;
a second ply group, wherein the layers of the second ply group are cross-plied at right angles and oriented in a +45°/−45° configuration with respect to the first ply group; and
a third ply group, wherein the layers of the third ply group are cross-plied at right angles and oriented in the 0°/90° configuration.

75. The soft panel of item 74, further comprising a backing layer comprising a dry felt material.

76. The soft panel of any of items 74-75, wherein the slip plane between at least one set of adjacent ply groups comprises a first layer of graphene particles or graphene-based ink between the first ply group and the second ply group, a second layer of graphene particles or graphene-based ink between the second ply group and the third ply group, and a third layer of graphene particles or graphene-based ink between the third ply group and the backing layer.

77. The soft panel of any of items 1-76, wherein the work softened lamination passes a V50 test for 2 grain right circular cylinder fragments traveling at a velocity of 2710 ft/sec at an areal density of at most 0.8 lb/ft$^2$.

78. The soft panel of any of items 1-77, wherein the work softened lamination passes a V50 test for 4 grain right circular cylinder fragments traveling at a velocity of 2400 ft/sec at an areal density of at most 0.8 lb/ft$^2$.

79. The soft panel of any of items 1-78, wherein the work softened lamination passes a V50 test for 16 grain right circular cylinder fragments traveling at 2010 ft/sec at an areal density of at most 0.8 lb/ft$^2$.

80. The soft panel of any of items 1-79, wherein the work softened lamination passes a V50 test for 17 grain fragment simulating projectiles traveling at 1850 ft/sec at an areal density of at most 0.8 lb/ft$^2$.

81. The soft panel of any of items 1-80, wherein the work softened lamination at an areal density of at most 0.8 lb/ft$^2$ provides protection against at least a National Institute of Justice threat level IIA, at least a National Institute of Justice threat level II, at least a National Institute of Justice threat level IIIA, or at least a National Institute of Justice threat level III.

82. The soft panel of any of items 1-81, wherein the panel comprises a soft armor panel.

83. A soft armor panel comprising the soft panel of items 1-81.

84. An armor panel article comprising the soft panel of any of items 1-81.

85. The armor panel article of item 84, wherein the armor panel article comprises a body armor panel.

86. The body armor panel of item 85, wherein the body armor panel comprises a body vest, a jacket, a helmet, a sports helmet, a hat, a face shield, a face mask, an ear pad, an ear covering, a mouth guard, a throat protector, a chin strap, a jaw pad, an eye shield, an elbow pad, pants, a leg guard, a shin guard, a foot guard, a knee pad, a boot, a shoe, a fencing garment, or an insert for a vest, a jacket or a back pack.

87. The armor panel article of item 84, wherein the armor panel article further comprises a layer of rigid armor having a non-planar contour, the soft panel adjacent to and shaped to conform to the non-planar contour of the rigid armor.

88. The armor panel article of item 87, wherein the rigid armor comprises a ceramic layer, a metal layer, or a composite ballistic material layer.

89. The armor panel article of any of items 84 and 87-88, wherein the armor panel article is contoured to conform to a vehicle door.

90. The armor panel of item 89, wherein the vehicle door comprises an automotive vehicle door.

91. The armor panel article of any of items 84 and 87-88, wherein the armor panel article comprises a panel for a vehicle door panel or a vehicle floor board panel, or a wrapping for an interior of an engine nacelle.

92. A panel for armoring a vehicle comprising the armor panel of an of items 1-81.

93. A process of forming a soft panel comprising:
providing a plurality of ply groups, each ply group comprising a plurality of layers of a composite material comprising fibers embedded in a matrix material;
laminating the ply groups together into a panel with a slip plane between at least one set of adjacent ply groups, the adjacent ply groups remaining unconnected or substantially unconnected at the slip plane; and
work softening the panel by applying a mechanical stress or mechanical strain or a thermal stress to the panel.

94. A process of forming a soft panel comprising:
providing a plurality of ply groups, each ply group comprising a plurality of layers of a composite material comprising fibers embedded in a matrix material;
laminating the ply groups together into a panel with a slip plane between at least one set of adjacent ply groups, the adjacent ply groups remaining unconnected or substantially unconnected at the slip plane; and
work softening the panel by applying a mechanical stress or mechanical strain to the panel.

95. The process of any of items 93-94, wherein the mechanical stress or mechanical strain is applied by bending, shear, impingement, stretching, or compression.

96. The process of any of items 93-95, wherein the mechanical stress or mechanical strain is applied by a work softening machine.

97. The process of any of items 93-96, wherein the mechanical stress or mechanical strain is applied by feeding the panel into a work softening machine.

98. The process of item 97, wherein the panel is fed into the work softening machine multiple times.

99. The process of any of items 97-98, wherein the panel is fed into the work softening machine between 2 and 50 times.

100. The process of any of items 97-99, wherein the panel is fed into the work softening machine between 3 and 20 times.

101. The process of any of items 97-100, wherein the panel is fed into the work softening machine in a forward direction and a reverse direction.

102. The process of any of items 97-101, wherein the panel is fed into the work softening machine at multiple orientations.

103. The process of any of items 97-102, wherein the panel is fed into the work softening machine at an orientation of one or more of 0°, 30°, 45°, 60°, or 90° with respect to an edge of the panel.

104. The process of any of items 93-103, wherein the mechanical stress or mechanical strain is applied by feeding the panel between intermeshing formers.

105. The process of item 104, wherein the intermeshing formers comprise rollers.

106. The process of item 104, wherein the intermeshing formers are star shaped.

107. The process of any of items 104 and 106, wherein the intermeshing formers are star shaped having a plurality of points.

108. The process of any of items 104 and 106-107, wherein the intermeshing formers have between 2 and 24 points.

109. The process of any of items 93-108, further comprising heating the panel prior to or during the step of applying the mechanical stress or strain.

110. The process of any of items 93-109, wherein the panel is heated to a temperature between 120 and 250° F.

111. The process of any of items 93-110, further comprising cooling the panel to a temperature below ambient temperature.

112. The process of any of items 93-111, further comprising inserting a release ply between the adjacent ply groups to form the slip plane.

113. The process of item 112, wherein the release ply comprises a layer of graphene.

114. The process of item 113 wherein the graphene has a thickness ranging from 0.0001 inch to 0.002 inch.

115. The process of any of items 112-114, wherein the release ply comprises a layer of silicone coated paper.

116. The process of any of items 93-114, further comprising, prior to the laminating step, inserting a silicone-coated sheet further coated with graphene particles or graphene-based ink on one or both surfaces between the adjacent ply groups to form the slip plane.

117. The process of item 116, further comprising, after the laminating step, removing the silicone-coated sheet, leaving the graphene particles or graphene-based ink on the adjacent ply groups.

118. The process of items 116-117, further comprising, after the laminating step, removing the silicone-coated sheet, leaving the graphene particles or graphene-based ink bonded to the adjacent ply groups.

119. The process of any of items 93-118, further comprising, after the work softening step, placing the panel into a vacuum bag, shaping the ply groups into a desired contoured configuration, and applying a vacuum within the vacuum bag.

120. The process of any of items 93-119, further comprising, prior to the laminating step, arranging the ply groups in an assembly in which the fibers within the layers in each ply group are cross-plied at right angles, wherein cross-plied fibers in a first ply group are oriented in a 0°/90° configuration, and cross-plied fibers in an adjacent second ply group are oriented at an angle between 30° to 60° with respect to the first ply group.

121. The process of any of items 93-120, further comprising placing a dry felt layer on a back face of the plurality of ply groups.

122. The process of any of items 93-121, wherein the laminating step further comprises laminating the ply groups at a pressure ranging from 10 to 10,000 psi.

123. The process of any of items 93-122, wherein the laminating step further comprising laminating the ply groups at a pressure ranging from 2000 to 4000 psi.

124. The process of any of items 93-123, wherein the laminating step further comprises laminating the ply groups at a temperature ranging from 70 to 500° F.

125. The process of any of items 93-124, wherein the laminating step further comprises laminating the ply groups at a temperature ranging from 200 to 300° F.

126. The process of any of items 93-125, wherein the laminating step further comprises laminating the ply groups for a time duration ranging from 10 minutes to 10 hours.

127. The process of any of items 93-126, wherein the laminating step further comprises laminating the ply groups for a time duration ranging from 30 minutes to 10 hours.

128. The process of any of items 93-127, further comprising, after the lamination step, reversing or flipping one of the ply groups in the panel.

129. The process of any of items 93-128, further comprising shaping the panel to a form of a human torso.

130. The process of any of items 93-129, further comprising enclosing the panel in a sealed cover after work softening.

131. The process of any of items 93-130, further comprising evacuating air from the sealed cover by a vacuum.

132. An apparatus for work softening a panel, comprising:
a housing, a feed path extending through the housing from an entrance opening in the housing to an exit opening in the housing;
an upper row of formers mounted for rotation within the housing above the feed path; and
a lower row of formers mounted for rotation within the housing below the feed path.

133. The apparatus of item 132, wherein the formers of the upper row of formers intermesh with the formers of the lower row of formers.

134. The apparatus of any of items 132-133, wherein the formers comprise rollers.

135. The apparatus of any of items 132-133, wherein the formers are star-shaped and have a plurality of points and valleys.

136. The apparatus of item 135, wherein the formers have between 2 and 24 points.

137. The apparatus of any of items 132-136, wherein the upper formers are mounted on an upper rotatable shaft and the lower formers are mounted on a lower rotatable shaft.

138. The apparatus of any of items 132-137, wherein the upper rotatable shaft and the lower rotatable shaft are rotatable in a forward direction and a reverse direction.

DESCRIPTION OF THE DRAWINGS

The invention will be more fully understood from the following detailed description taken in conjunction with the accompanying drawings in which:

FIG. 1 is a schematic plan view of an embodiment of a soft armor panel;

FIG. 2 is a cross-sectional view along lines II-II of FIG. 1;

FIG. 16 is a schematic cross-sectional front view of the softening machine of FIG. 15;

FIG. 29 illustrates the back of a test panel with a felt backing layer after a V50 test;

FIGS. 30A, 30B and 30C illustrate fragments caught in felt fibers of a test panel with a felt baking layer;

DETAILED DESCRIPTION OF THE INVENTION

Figure 3:
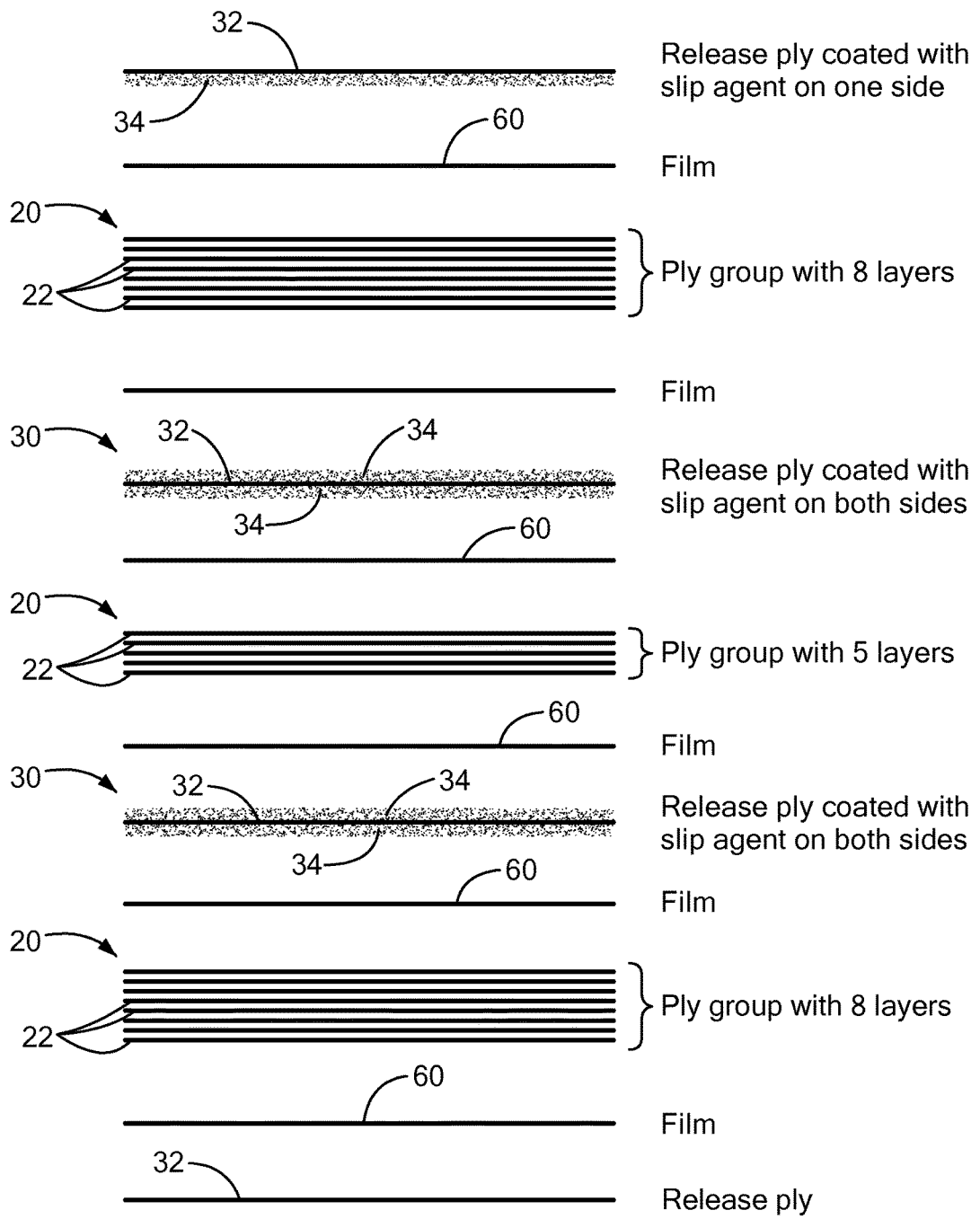
FIG. 3 is a schematic exploded view of an assembly of layers prior to lamination for fabricating a soft armor panel.

An armor panel, such as a soft armor panel, is provided that is formed from a rigid composite material that has been work softened to introduce sufficient compliance so that the panel can conform, for example, to the human body. Work softening of the panel introduces defects into the material. Additionally, the panel is formed of a lamination of ply groups that are unconnected or substantially unconnected to adjacent ply groups by the inclusion of slip planes within the lamination. Testing (described further below) has shown that superior ballistic performance can be achieved over traditional soft armor.

Referring to FIGS. 1-2, one embodiment of a soft armor panel is formed from a lamination that comprises a plurality of ply groups 20. A backing layer or layers 40 and/or a front face layer or layers 50 can be included if desired. Other interior layers (not shown in FIGS. 1 and 2) can be included if desired. Each ply group 20 comprises a plurality of layers 22 of a composite material of fibers embedded in a matrix material. The fibers in each layer can have a variety of orientations, described further below. To form a panel 10, a stack of ply groups, and optionally other layers, are laminated together under heat and pressure to consolidate the layers within each ply group. Slip planes 30, described further below, are formed between at least two and in some embodiments between all adjacent ply groups in the panel. The slip planes enable adjacent ply groups to remain unconnected or substantially unconnected to each other after lamination and allow sliding to occur more easily between adjacent surfaces of ply groups in a ballistic event, which helps to reduce maximum back side deflection. The laminated panel is subsequently work softened, which introduces into each consolidated ply group a plurality of defects and renders the lamination more compliant. The defects, which can occur at any location throughout the panel, comprise one or more disbond defects and delamination defects between the fibers or layers within a ply group or between laminated ply groups. A work softened or compliant armor panel can more readily conform to a human torso when used in a garment such as a ballistic resistant vest and is more comfortable to wear.

An exemplary panel assembly 12 of ply groups 20 and other layers arranged for lamination is illustrated schematically in FIG. 3. The panel assembly shown has three ply groups 20, but any desired number of ply groups can be used, depending on the application. Similarly, each ply group can have any suitable number of layers 22, depending on the application. A protective film 60 can be placed over both surfaces of each ply group to provide protection from oil, gasoline, and other contaminants. The film can be made from, for example, a polyolefin, preferably a high density polyethylene or polypropylene, urethane, or another thermoplastic or thermoset with a processing temperature below the melt temperature of the fibers of the composite material. The film bonds to the adjacent ply group during lamination. The outer surfaces of the panel assembly can also be covered with a protective film 60 that transfers to the adjacent surface during lamination.

In the panel assembly, at least two and in some embodiments all adjacent ply groups are separated by an intentional slip plane 30 during lamination. Slip planes between ply groups can be formed by a variety of mechanisms (described further below) that allow sufficient slippage so that the panel can perform well during a ballistic event, that is, an impact by a projectile such as a bullet fired by a firearm. In some embodiments, the slip plane can also help to hold the panel together and in a desired shape during normal using (not during a ballistic event), such as when the panel is incorporated into an article, for example, a ballistic resistant vest to be worn by a person. That is, the degree of slip or adhesion between adjacent ply groups can be controlled by the choice of material(s) that form the slip plane and the mechanism of fabricating the slip plane. Thus, as used herein, ply groups are "substantially unconnected" when the slip plane(s) allow the ply groups to move in shear relative to each other during a ballistic event, while helping to hold the ply groups together in a particular shape for normal use.

Figure 4:
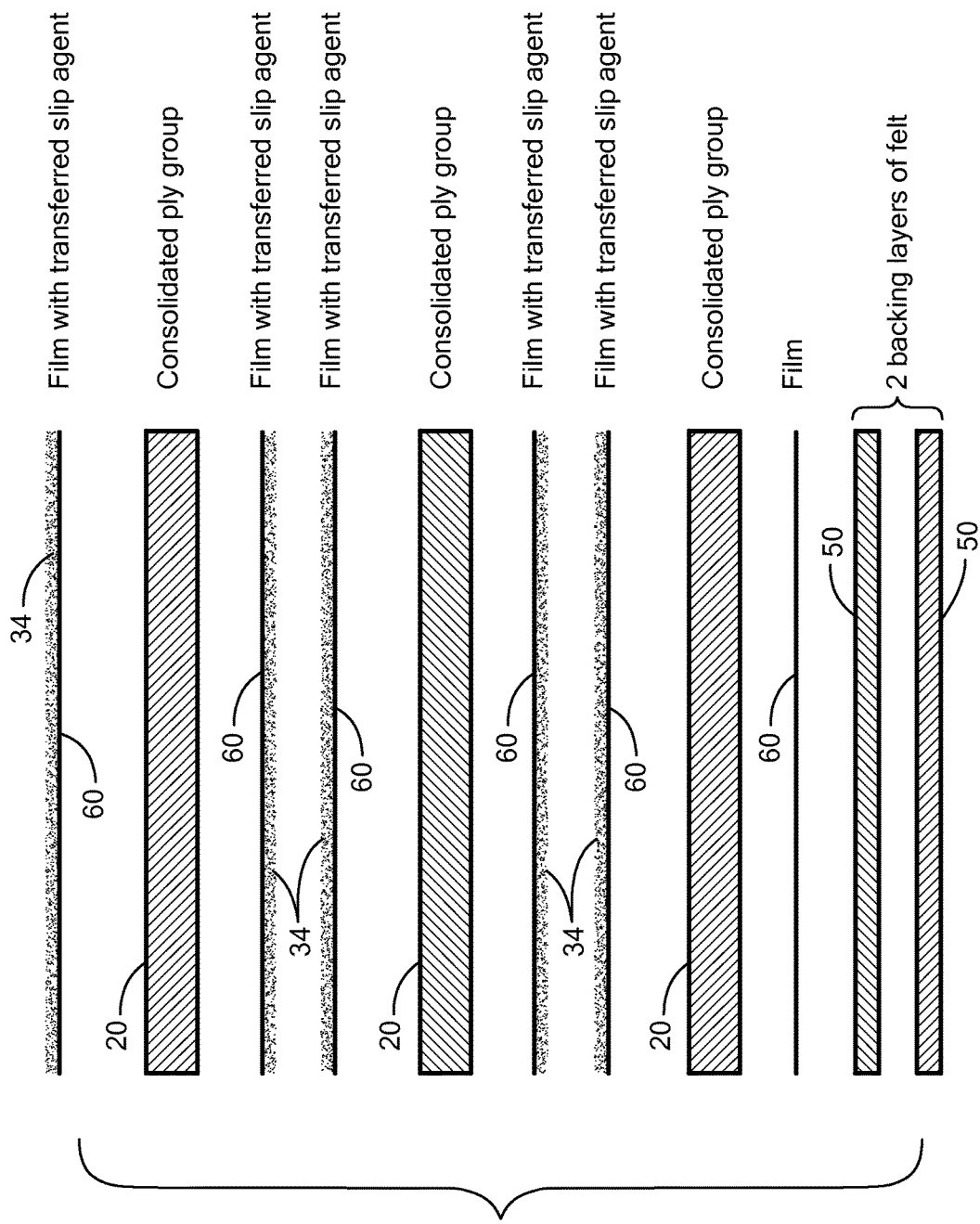
FIG. 4 is a schematic exploded view of a lamination for a soft armor panel.

In some embodiments, a slip plane is created by inclusion of a release ply during lamination. The release ply can include a substrate 32 of a non-stick material, such as a paper coated with a release agent, such as silicone or another low surface energy material. The non-stick substrate can withstand the heat and pressure within a lamination machine without melting or bonding to the adjacent surfaces, so that it can be subsequently removed. The non-stick substrate is additionally coated on both sides with a slip agent 34 (illustrated schematically as dots on FIGS. 3 and 4) that, during lamination, transfers to the adjacent protective film 60 on the ply group surfaces. In one embodiment, the slip agent comprises graphene. In some embodiments, the graphene on the release ply can be provided as graphene particles or a dry graphene-based ink applied as a layer having a thickness ranging from 0.0001 inch to 0.002 inch. In some embodiments, the graphene layer comprises 1 wt. % or less of the weight of an adjacent ply group. One suitable graphene-based ink is VOR-INK®, commercially available from Vorbeck Materials Corporation. The graphene-based ink is available as a liquid, which can be coated and dried onto a sheet of the release ply, such as silicone-coated paper, by a printing process, such as rotogravure printing using an unengraved cylinder to coat the entire sheet. Other printing processes, such as flexographic printing, lithography, offset printing, screen printing, or digital printing, can be used. The ink can contain additional components, such as polymeric binders. Generally, an ink having a lesser amount of binder can be used, as a lesser amount of binder provides better lubrication, and can also improve the sloughing characteristics of the ink off the release ply, which can be helpful to transfer the graphene to the ply group surface and create a slip plane.

A release ply 32 with a slip agent 34 such as graphene can also be located on a strike face of a panel. In this case, the graphene-impregnated surface that is formed surprisingly results in less penetration of the soft armor panel as described herein.

A variety of materials can serve as slip agent, depending on their coefficient of friction and bonding to the adjacent ply group. Examples include, without limitation, graphene particles, metallic particles, ceramic particles, paper, plastic films (such as a high density polyethylene or polyethylene terephthalate), or metallic foils (such as an aluminum foil). The amount and type of slip agent to use can vary depending on the threat level against which protection is desired, and the thickness and geometry of the completed soft armor panel. For example, a ballistic vest can be made in a variety of sizes, from extra small to extra large, and the geometry or shape of each size differs. Smaller sizes tend to have a more rectangular shape and larger sizes tend to have greater cutaway areas for the armholes and neckline. The larger sizes can employ a greater amount of slip agent than the smaller sizes to meet the same threat level. The amount of slip agent can be readily determined empirically by, for example, testing for the particular threat level, such as with the V50 test and the Back Side Deflection test, described further below.

Slip planes can be incorporated into the lamination in various ways. In some embodiments, a release film, such as a layer of silicone-coated paper or silicone-coated polyethylene terephthalate (PET) film, can be incorporated between ply groups. Subsequent softening tends to delaminate the panel at the film layer locations, creating a multi-panel assembly. In another example, non-compatible resin systems, in which the resins do not bind to each other, can be introduced to create engineered discontinuities at specific ply locations. In a further example, a single ply or several plies comprising fibers oriented at a different angle from fibers in adjacent plies can be incorporated into the panel, including between or within ply groups. For example, a ply group can include adjacent layers of fibers oriented at +45°/−45° as well as adjacent layers of fibers oriented at 0°/90°. Such fiber orientation is often referred to as cross plied UD (unidirectional) in the art.

Slip planes can be modified by a variety of mechanisms to help hold the panel together and retain its shape during normal use while allowing sufficient slippage to perform well during a ballistic event. For example, a soft spray or contact adhesive can add a variety of properties to the slip plane, including 1) some resistance to slipping of a viscoelastic nature but still allow conformability, 2) lubricity between ply-groups, and 3) connective properties tending to hold the lamination together. The adhesive can be applied either before or after work softening. A soft spray adhesive such as 3M Super77™ spray adhesive is a suitable adhesive. In another example, a fastening mechanism, such as hook and loop fastener (for example, a VELCRO® fastener), can be located between ply-groups in patches or continuously, and can provide similar attributes.

Combinations of such techniques can be used to create a single slip plane or multiple slip planes. Additionally, each slip plane can be created using a different technique or techniques to provide differing levels of slippage or adherence throughout the lamination.

The panel assembly is placed in a lamination machine for lamination. Multiple panel assemblies can be stacked and laminated at the same time if desired. A release ply 32 of, for example, silicone-coated paper is also placed on both outer surfaces of the assembly to prevent adherence to the lamination machine or to another panel assembly, if present. Lamination can occur at a temperature ranging from 70 to 500° F. at a pressure ranging from 10 to 10,000 psi for a duration ranging from 10 minutes to 10 hours, depending on the materials used and the thickness and geometry of the panel assembly. In some embodiments, lamination can occur at a pressure ranging from 2000 to 4000 psi. In some embodiments, the temperature can range from 200 to 300° F. Preferably, the upper temperature is chosen below the melting temperature of the fibers in the ply group, or in the event of non-melting fibers, at a temperature advantageous for processing the resin matrix, for example, to achieve a highest speed of processing and/or desirable matrix properties. In some embodiments, lamination can occur for a duration ranging from 30 minutes to 10 hours. During the lamination operation, layers 22 within a ply group 20 are consolidated and adhere to one another, while no or little adhesion occurs between adjacent ply groups separated by a release ply 32. The resulting lamination is a rigid panel. For example, in a droop test as described below, the droop angle is substantially 0°.

If multiple panel assemblies are laminated in a single lamination operation, they are separated, for example, by hand along the release ply. Each resulting laminated panel can be cut to a desired shape, such as a shape suitable for a ballistic-resistant vest as illustrated in FIG. 1. The ply groups can be separated at the slip planes to remove the non-stick substrates 32 (for example, the silicone-coated paper), leaving the slip agent 34 (for example, the graphene) adhering to the film 60 on the surfaces of the ply groups 20. See FIG. 4. The layers within each ply group are not separable by hand. The ply groups are then restacked, and the panel is introduced into a work softening machine for work softening (described further below) to introduce defects into the ply groups and increase the panel's compliance.

Figure 5:
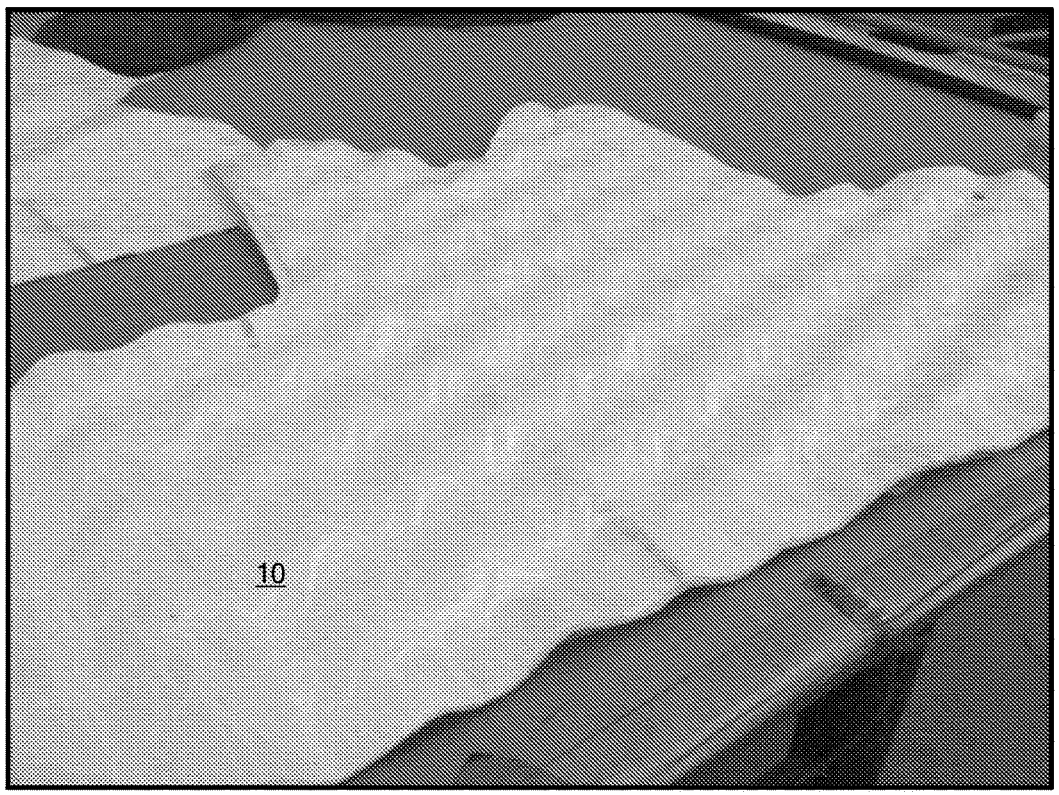
FIG. 5 is a photograph of a soft armor panel that has been work softened, illustrating a bumpy texture.
Figure 6:
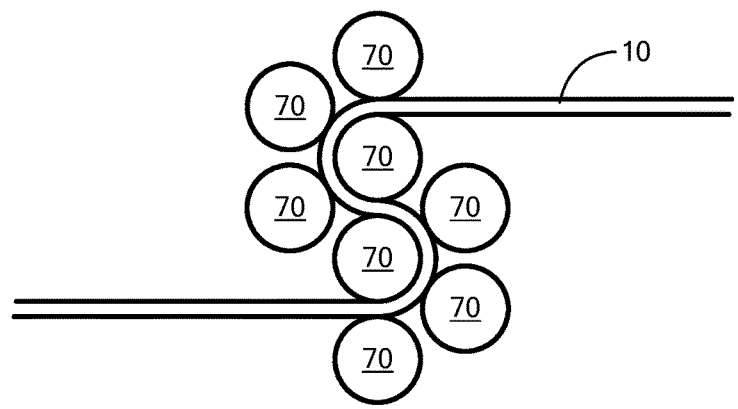
FIG. 6 is a schematic illustration of a series of rollers for flattening a panel with a bumpy texture.

After work softening, the panel 10 can have a bumpy texture (FIG. 5) that can be flattened, for example, by passing the panel between a series of small diameter (for example, ⅝ inch) rollers 70. See, for example, FIG. 6. Also after work softening, the fiber orientation of one or more ply groups that are separated by a slip plane from adjacent ply groups can be altered by rotating or flipping one or more ply groups. This can help randomize discontinuities and provide additional discontinuities in the panel in some embodiments.

Any additional layers, such as a backing layer 50 and/or a strike face layer 40, can be added to the panel. In some embodiments, one or more felt layers can be added as a backing layer to act as a catcher layer for enhanced fragment protection. In some embodiments, one or more felt layers can be added as a front effector ply or strike face layer to begin the process of deforming an incoming projectile, for example, by stripping the jacket off a bullet.

Figure 7A:
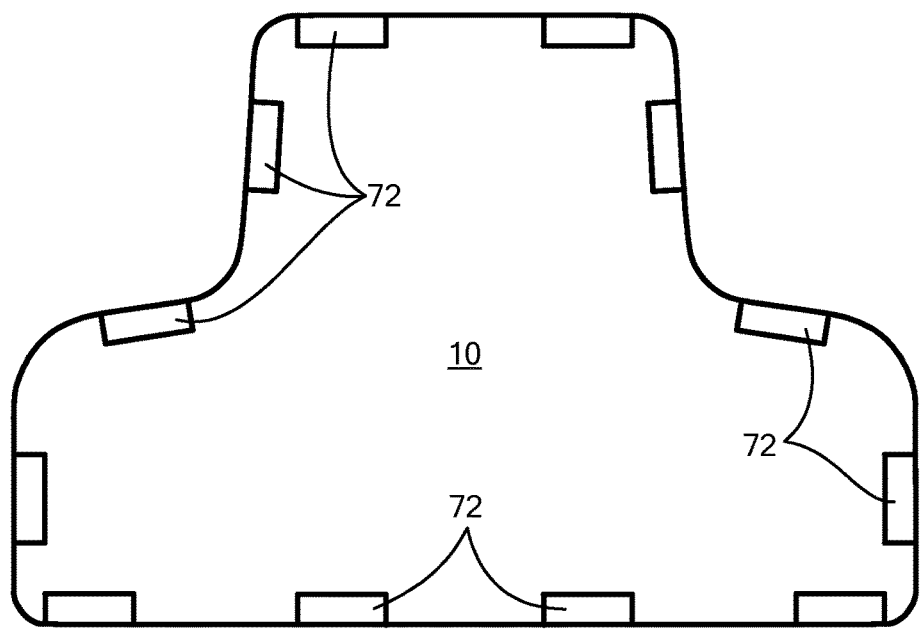
FIG. 7A is a schematic illustration of a soft armor panel taped along its edges.
Figure 7B:
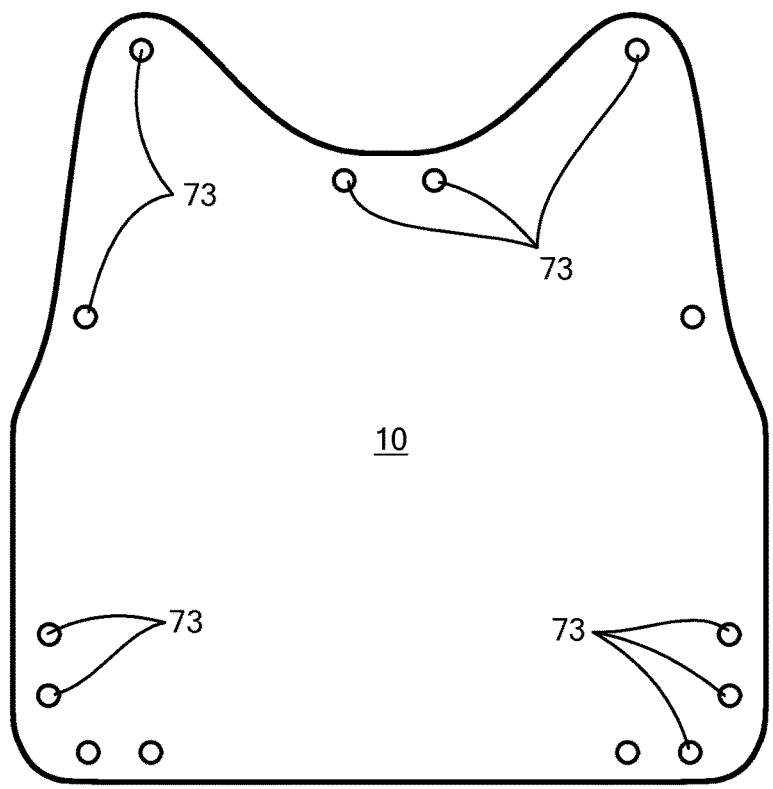
FIG. 7B is a schematic illustration of a soft armor panel with rivets near edges.
Figure 8:
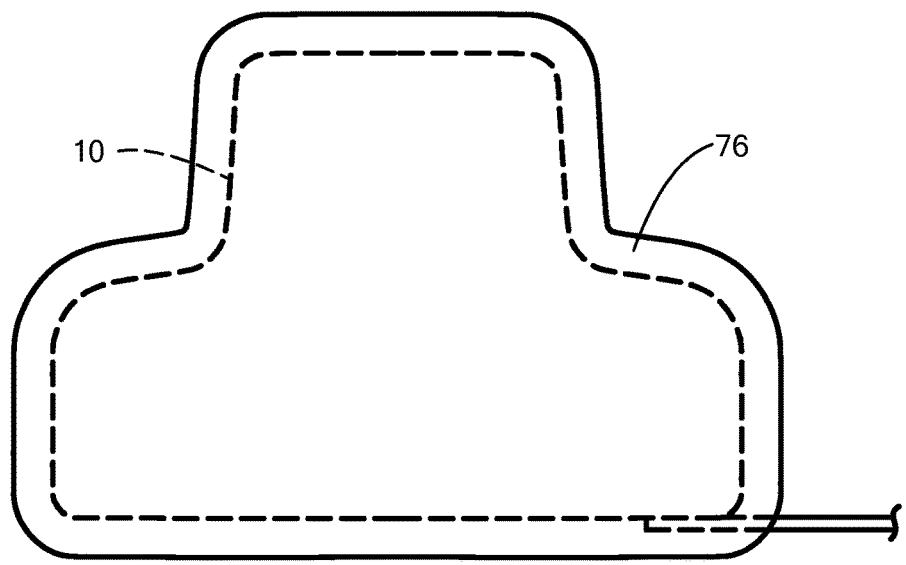
FIG. 8 is a schematic illustration of a soft armor panel in a vacuum bag.

The stack can be fastened together in any suitable manner, such as with tape along the edges, with rivets, stitching, or hook and loop fasteners at selected locations, or with a soft adhesive to hold the ply groups and other layers together as a finished article, while still allowing sliding along the slip planes during a ballistic event. A polymer-based pressure sensitive adhesive tape, such as Gorilla Tape available from The Gorilla Glue Company in Ohio, is suitable as an edge tape. For example, FIG. 7A illustrates an embodiment of a softened panel 10 formed into a vest panel for body armor in which the edges are held together with tape 72. In another example, FIG. 7B illustrates an embodiment in which rivets 73 have been inserted through the thickness of the panel at locations near edges of the panel, for example, along the shoulders and neckline and around the lower corners. Fasteners can be placed at any other locations as desired. In other embodiments, tack stitches can be used to hold the panel together.

In some embodiments, the stack is placed within a protective covering and sealed. The protective covering can be any suitable material, such as seal-coated rip-stop nylon, in the range of 30 to 200 denier. In other embodiments, a protective sealed covering is not used or required.

In some embodiments, after work softening, the compliant panel can be shaped into a desired contour, for example to conform to a male or female human torso. In one embodiment, a work softened panel 10 comprising an assembly of ply groups can be placed within a vacuum bag 76 and shaped without vacuum to a desired contour. The ply groups can slide with respect to one another with relatively low bending stiffness, allowing conformation to body contours. While holding the contoured shape, the vacuum bag is evacuated, clamping the assembly of ply groups together and forcing them to act as one. Once clamped under vacuum, the panel tends to hold the contour shape. The degree of firmness can be increased or decreased by the amount of vacuum. While the vacuum seal would be broken upon impact by a projectile, the panel's ballistic performance would remain the same.

A shaped panel can also be tacked together to hold the desired contour, for example, with tape, tack stitching, rivets, adhesive, or the like. Point bonding can be sufficient to hold a contour while still allowing the plies to move in shear relative to each other during a ballistic event.

More particularly, the bending stiffness of an assembly of, for example, three independent ply-groups bent together, but allowed to slide relative to each other, is the sum of the independent bending stiffness of each, given by:

$$3\left(\frac{Eh_0^3}{12}\right),$$

where $h_0$ is the thickness of one ply-group (assumed equal in this particular case), and E is the effective modulus of the ply-group. However, if the ply-groups are bonded or otherwise held together with enough force to inhibit the sliding of one ply-group relative to another during normal use (that is, not during a ballistic event), then the bending stiffness is given by:

$$\left(\frac{E(3h_0)^3}{12}\right) = 27\left(\frac{Eh_0^3}{12}\right),$$

which is 9 times the bending stiffness of the sliding assembly. The stiffening effect will also occur for 1) ply-groups composed of anisotropic layers, 2) where the ply-groups are not identical, and 3) where the number of ply-groups is greater than or equal to 2.

In some embodiments, the degree of firmness can be altered by a person wearing a ballistic vest sealed in a vacuum pouch with a valve. The valve can be opened to let air in for a looser fit. A pump, such as a hand or motorized pump, can be attached to the valve to pump air out for a firmer fit.

As noted above, each ply group is formed of a plurality of layers, and each layer is formed of a composite material of fibers embedded in a matrix material. The fibers in each layer can be, for example woven, non-woven, felted, unidirectional, cross-plied, or knitted, or combinations of these types. The number of layers in each ply group can range from 1 to 10 layers or more. In some embodiments, a ply group can have 1 layer, 2 layers, 3 layers, 4 layers, 5, layers, 6 layers, 7 layers, 8 layers, 9 layers, 10 layers, or more layers. Within one panel, different ply groups can have different numbers of layers. Other types of layers, such as felt layers, foam layers, or film layers, can be included in the panel, for example, between ply groups or on a front or back face of the lamination.

In one embodiment, the layers of a ply group comprise fibers of an ultra-high molecular weight polyethylene (UHMWPE) embedded in a urethane resin matrix. Suitable UHMWPE material is commercially available as a prepreg made from a few plies of unidirectional fibers cross-plied or stacked in alternating orientations, for example, 0°/90° or 0°/90°/0°/90° for a two-layered or a four-layered prepreg. The fibers within each layer can also be cross plied at any other angle between 0° and 90°. One sheet of prepreg can form a layer in a ply group.

Ultra-high molecular weight polyethylene fibers can be manufactured by any technique known in the art. In some embodiments, a melt or a gel spinning process can be used. Gel spun UHMWPE fibers, sold by DSM Corporation, under the name DYNEEMA® are one suitable embodiment. If a melt spinning process is used, the polyethylene starting material used for manufacturing has a weight-average molecular weight in some embodiments between 20,000 and 600,000 g/mol, and more preferably between 60,000 and 200,000 g/mol. An example of a melt spinning process is disclosed in EP 1,350,868. If a gel spinning process is used, a UHMWPE is used with an intrinsic viscosity (IV) of in some embodiments at least 3 dl/g, preferably at least 4 dl/g, and more preferably at least 5 dl/g. In some embodiments, the IV is at most 40 dl/g, preferably at most 25 dl/g, and more preferably at most 15 dl/g. IV can be determined according to ASTM D1601 at 135° C. in decalin, the dissolution time being 16 hours, with DBPC as antioxidant in an amount of 2 g/l solution, by extrapolating the viscosity as measured at different concentrations to zero concentration. Preferably, the UHMWPE has less than 1 side chain per 100 C atoms, more preferably less than 1 side chain per 300 C atoms. Examples of gel spinning processes are described in, for example, EP 0205960 A, EP 0213208 A1, U.S. Pat. No. 4,413,110, GB 2042414 A, GB-A-2051667, EP 0200547, EP 0472114 B1, WO 2001/73173 A1, and EP 1,699,954.

One suitable commercially available prepreg material of UHMWPE fibers in a resin matrix is available under the brand name DYNEEMA® from the DSM Corporation, for example, DYNEEMA® HB-2, HB-26, HB-50, HB-56, HB-210, HB-212, or BT-10. The ply groups could be made of any other suitable fiber, for example, and without limitation, aramid fibers, glass fibers, liquid crystal polymer (LCP) fibers, and polybenzoxazole (PBO) fibers. Combinations of fibers can also be used. A variety of resins can be used for the matrix material, such as, without limitation, a thermoset resin or rubber or a thermoplastic resin or rubber. Thermoset resins and rubbers can include, without limitation, urethane, epoxy, and polyester thermoset resins. Thermoplastic resins and rubbers can include, without limitation, polyolefins, including polypropylene, nylon, low molecular weight polyethylene, polystyrene, or a styrene butadiene block copolymer or styrene isoprene block copolymer (available, for example, from Kraton Performance Polymers, Inc.). Combinations of such materials can be used as well.

The fibers within a ply group or within a layer can take any form, such as filament, tow, staple, or tape. Fibers can be in the form of yarns, which are an assembly of continuous or discontinuous fibers in a continuous twisted form. Yarns can be formed from combinations of continuous and discontinuous fibers. Yarns can be formed from multiple fiber types, such as hybridized fibers. For example, combinations of aramid fibers and UHMWPE fibers can be used. Bicomponent fibers can be used in which, for example, fibers are formed of two differing materials in a sheath/core, side-by-side or other configuration.

The ply groups can be stacked with the fibers arranged at different angles relative to adjacent ply groups or any other ply group in the stack. In some embodiments, unidirectional cross-plied fibers in a first ply group are oriented in a 0°/90° configuration and cross-plied fibers in an adjacent second ply group are oriented at an angle between 30° to 60° with respect to the first ply group. In some embodiments, the cross-plied fibers in the second ply group are arranged in a +45°, −45° configuration with respect to the first ply group. In further embodiments, cross-plied fibers in a third ply group adjacent to the second ply group are oriented in the 0°/90° configuration. In some embodiments, the fibers of all of the plies in at least one of the layers are oriented in a same direction. In other embodiments, the fibers of adjacent plies in at least one of the layers are oriented at different angles.

A panel can include one or more dry (i.e., with less than 5 wt. % resin or preferably with no resin) fiber layers, which can be, for example, woven, non-woven, felted, unidirectional, or knitted fiber layers. Dry fabrics are generally softer than prepregs, as they lack the resin that adds stiffness. For example, dry woven fabrics of UHMWPE or aramid can be interspersed between ply groups of prepreg (for example, UHMWPE fibers in a urethane matrix) within a panel. As another example, dry felts of UHMWPE or aramid can be interspersed between ply groups of prepreg within a panel. The dry fabrics can be formed from yarns or any other fiber form. One embodiment of a dry felt has an areal density of approximately 0.038 lb/ft$^2$.

A panel can include ply groups or layers of the same material or of different materials. For example, materials having different mechanical properties can be combined to provide a greater range of mechanical properties in the finished product.

In some embodiments, a panel can include at least three groups, in which a middle ply group can have an areal density greater than areal densities of the outer or surrounding ply groups. In some embodiments, the areal density of each ply group can range from 0.05 lb/ft$^2$ to 1.0 lb/ft$^2$. In some embodiments, particularly embodiments intended for use as body armor, the panel after lamination, work softening, and the addition of any further layers has a thickness ranging from 0.01 to 0.5 inch. In some embodiments, the thickness can range from 0.01 to 0.3 inch. Greater or lesser areal densities and/or thicknesses can, however, be provided, depending on the application.

Figure 9:
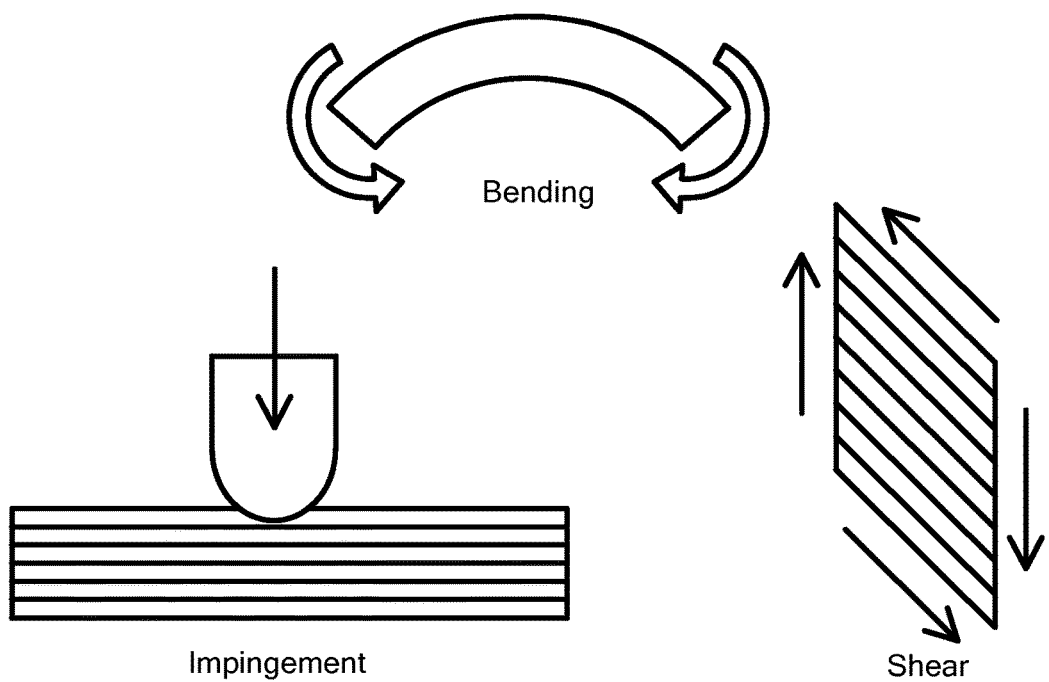
FIG. 9 is a schematic illustration of several softening mechanisms.

As noted above, after lamination, the panel is work softened to introduce defects into each ply group. Work softening, or softening, as used herein, refers to the application of mechanical stress or strain or the application of thermal stress, or a combination thereof, to an article, with the intended outcome being an increased compliance, i.e., decreased stiffness, of the article. Three stress or strain mechanisms that can typically be used in the softening process are bending, shear, and impingement, shown schematically in FIG. 9. Stretching (tension) and compression mechanisms can also be used. Various types of equipment can be provided to accomplish the softening, depending on the mechanism used. Thermal stress can be applied by the use of heat or cold.

Figure 10:
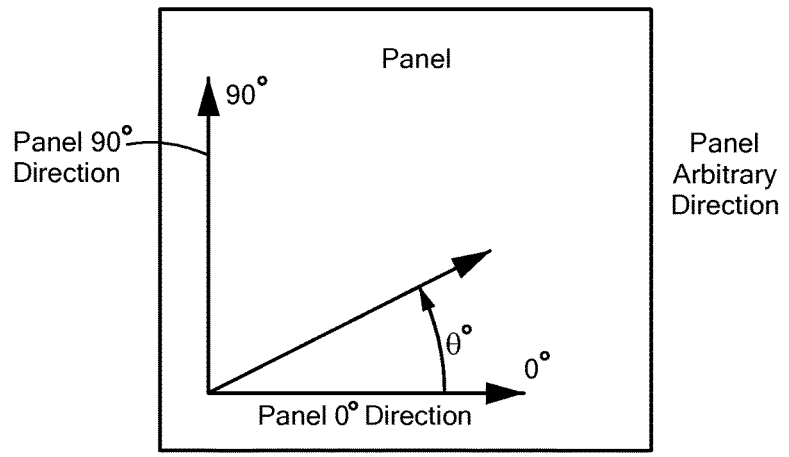
FIG. 10 is a schematic illustration of a panel orientation nomenclature.

In one exemplary embodiment, a rigid panel comprising a laminated stack of ply groups is fed into a softening machine that applies one or more mechanical stress or strain mechanisms to the panel, described further below. FIG. 10 shows a panel orientation nomenclature for use in reference to the softening process and the softening machine: the panel 0° direction is along one edge, usually defined in manufacture, and the panel 90° direction is perpendicular to the panel 0° direction. The panel does not have to be square or rectangular to have these orientations associated with it. There is also an arbitrary orientation that can be at any angle between 0° and 360°. These orientations are used to reference panel directions for fiber orientation and stacking sequence, as well as the feeding direction into the softening machine.

Figure 11:
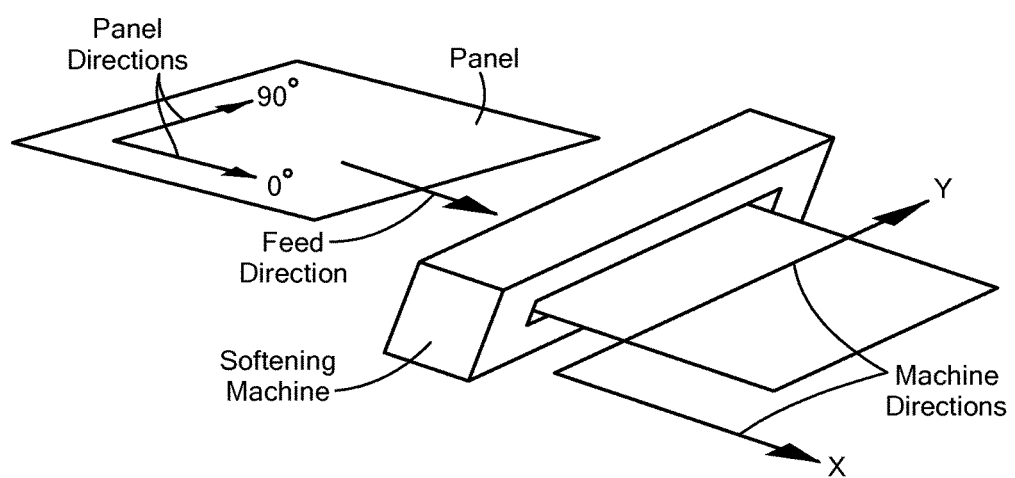
FIG. 11 is a schematic illustration of a panel orientation in relation to a machine orientation.
Figures 12A, 12B, 12C, 12D:
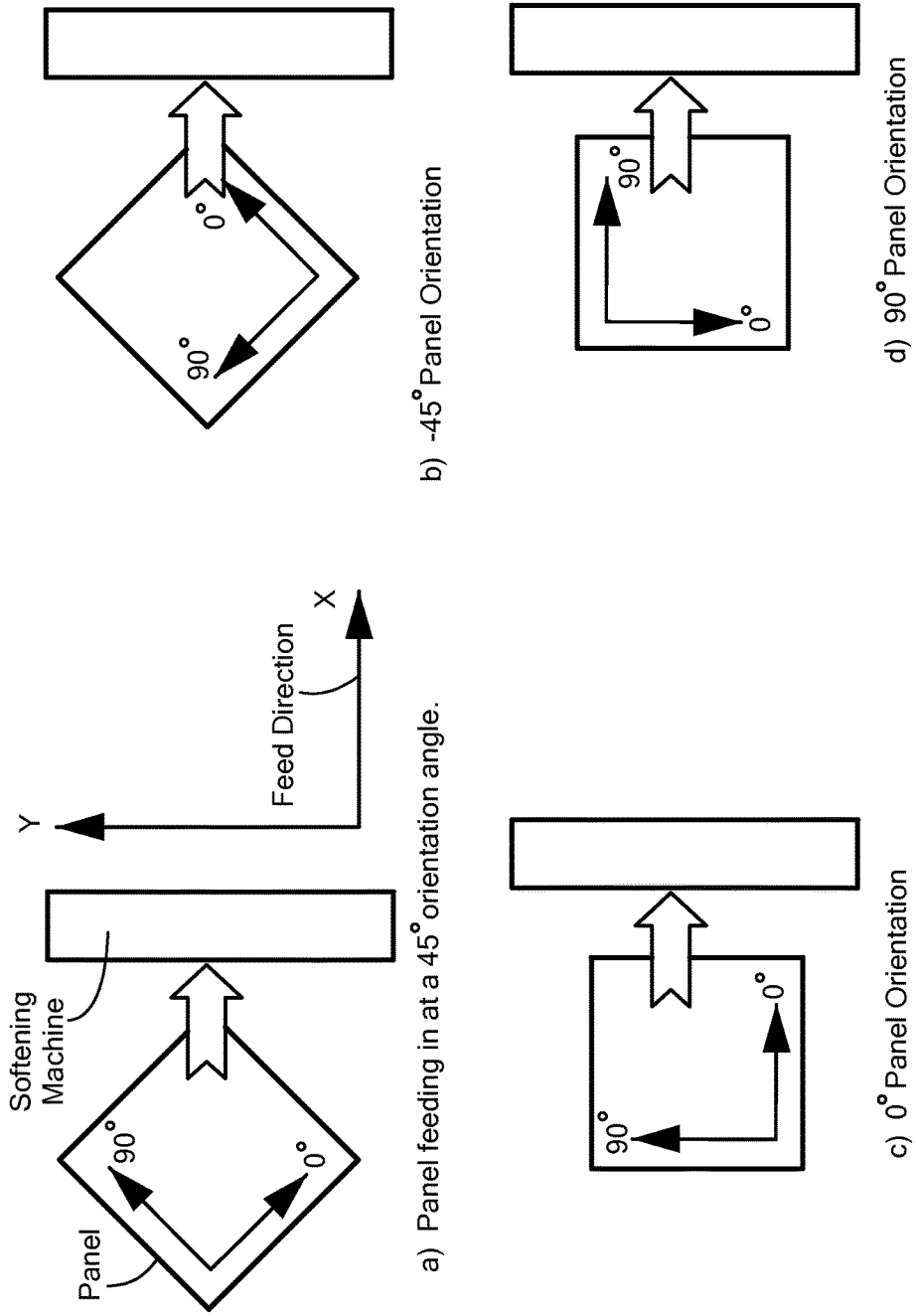
FIGS. 12A through 12D are schematic illustrations of various orientations for feeding panels into a softening machine.

FIG. 11 shows the machine directions that are used for reference to how the panel is deformed in the machine. The "X" axis is in the feed direction of the machine, and the "Y" axis is across the width of the machine, generally perpendicular to "X". Depending on the configuration of the machine, the panel softening deformation may take place along the X axis, Y axis, or both. The panel can move once or multiple times through the machine in the feed direction, or the panel can move back and forth, first in the feed direction and then opposite to the feed direction, for example, by running the machine in a reverse direction. The panel can move in such a back and forth sequence multiple times in order to increase the softening effect.

In addition to the single machine pass described, multiple passes are possible with different panel orientation angles, to further the softening process, and promote uniform softening. FIGS. 12A-12D show four feed orientation angles, −45°, 45°, 0°, 90°, into the softening machine, as examples. Any angle between 0° and 360° is possible.

In one embodiment, multiple passes through the softening machine can be made, with various panel angles being fed into the machine. For example, multiple passes could be sequenced through the following angles, 45°, −45°, 0°, 90°, 30°, −30°, 60°, −60°, for a total of 8 passes. This sequence could also be repeated 1, 2, 3 or more times, yielding 8, 16, 24, or more total passes through the machine. The 45° orientation can be fed first, because feeding the corner in first helps the machine to "bite" and pull the panel into the device, with subsequent passes being easier to feed in at any angle because the panel is softer and easier to start.

Figure 13A:
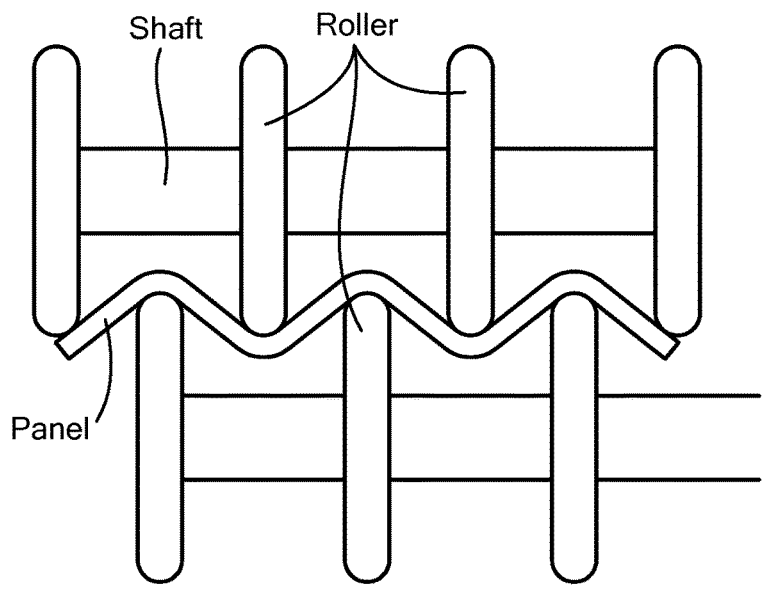
FIG. 13A is a front view of an embodiment of a feeding process using an opposing rollers softening machine.
Figure 13B:
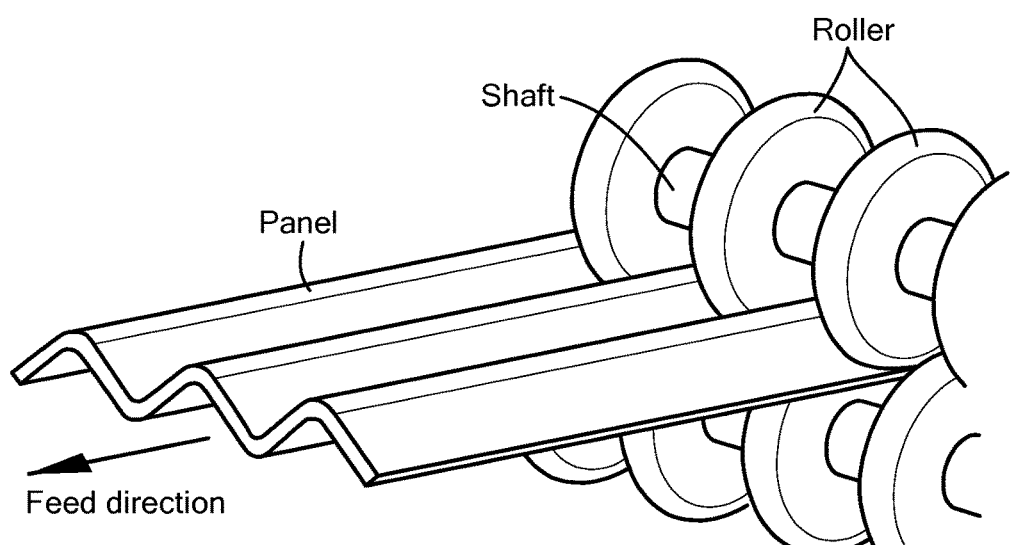
FIG. 13B is an isometric view of the feeding process of FIG. 13A.

One embodiment of a softening machine is of the opposing roller type, in which the softening process is to pass the panel through two sets of opposing rollers as shown in FIGS. 13A and 13B, with rollers offset in the "Y" direction, to deform the panel into a corrugated shape. While the panel may not exit the machine retaining the corrugated shape, because of spring back, the softening attributes of the panel are retained.

Figure 14:
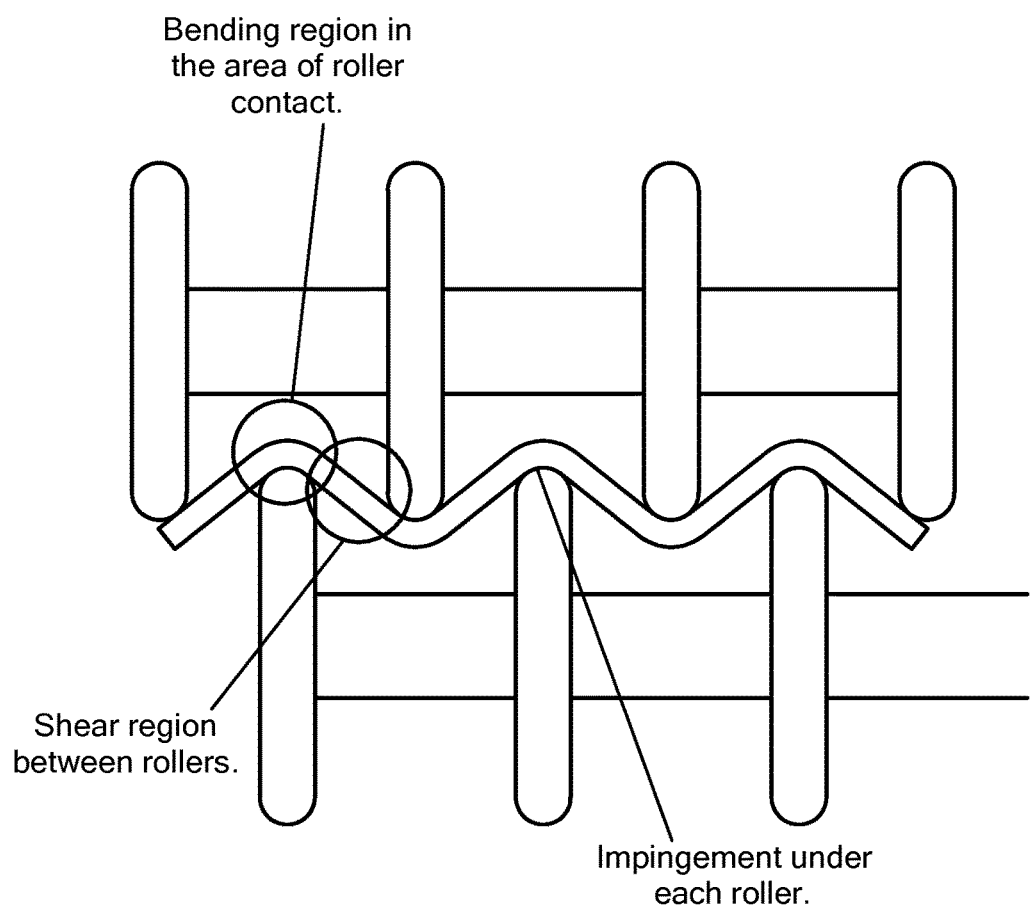
FIG. 14 is a schematic illustration of deformation regions in the process of FIGS. 13A and 13B.

FIG. 14 schematically shows the deformation regions in the opposing roller machine. Primary bending takes place in the panel under each roller and continues through the thickness, while primary shear takes place between rollers. Both are deformed primarily in the "Y" direction across the width of the machine; however there is some "X" contribution as the panel enters into the roller and transitions from a flat to a corrugated shape.

Figure 15:
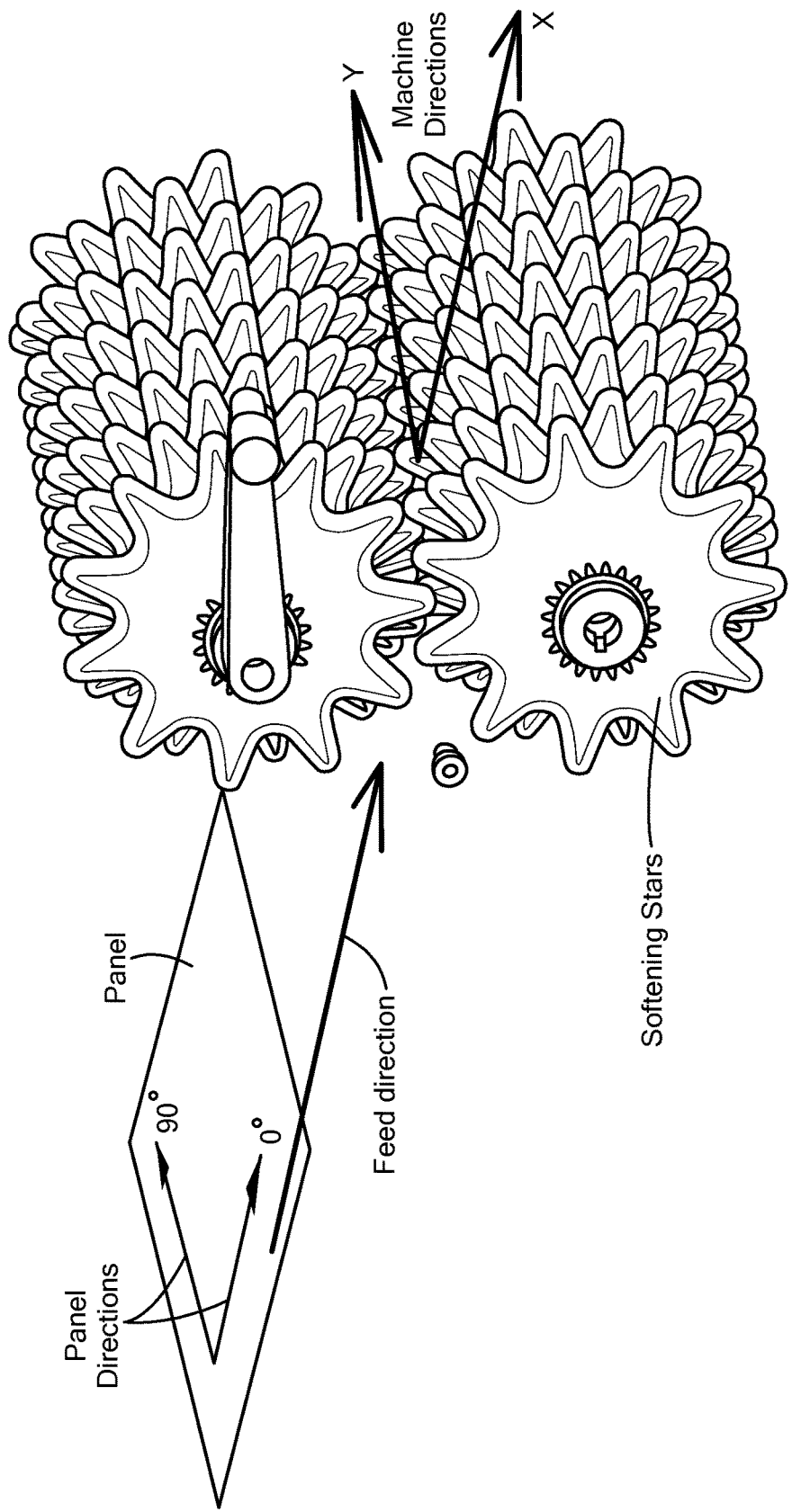
FIG. 15 is a schematic isometric view of an embodiment of a feeding process using an intermeshing star shaped former softening machine.
Figure 17B:
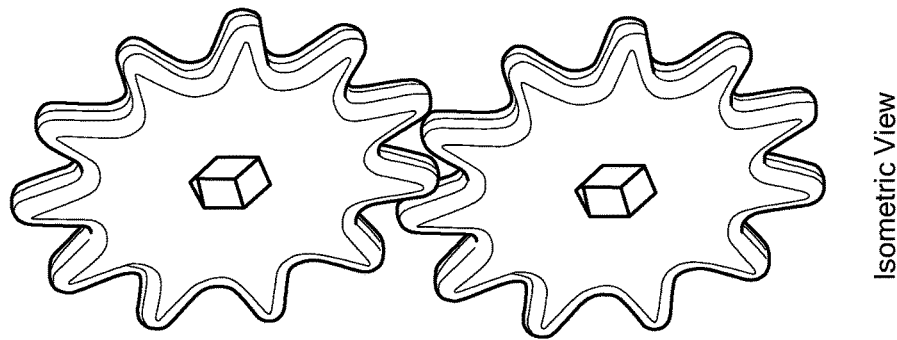
FIG. 17B is a schematic isometric view of the two opposing stars of FIG. 17A.
Figure 17A:
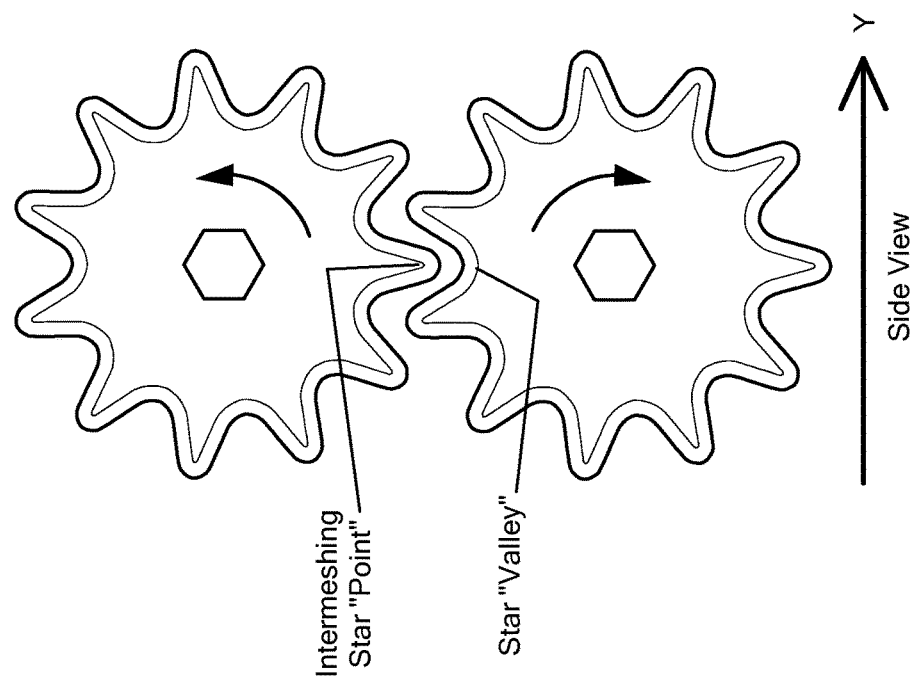
FIG. 17A is a schematic side view of two opposing stars in the intermeshing star shaped former softening machine.

An intermeshing star type machine is a variation on the opposing roller type, in which rollers are replaced with star shaped formers (also called stars, softening stars, or star formers herein) as shown in FIGS. 15 and 16. Shear and bending deformation are promoted along the "Y" direction by having the stars intermesh along the "Y" direction. FIG. 16 shows a cross section front view of the machine, revealing alternating up/down star points along the "Y" direction. Alternating up/down point/valley regions along the "Y" direction force the panel to follow an undulating path along the "Y" direction. The points of the stars also promote impingement deformation at the point locations. Shear and bending deformations are promoted along the "X" direction by having opposing stars intermesh so that "points" and "valleys" line up as shown in FIGS. 17A and 17B. Rotation of the stars as shown moves the panel through the process along the "X" direction. The points of the stars also promote impingement deformation at the point contact locations. Any suitable number of points can be provided. In some embodiments, between 2 and 24 points are provided.

Figure 18:
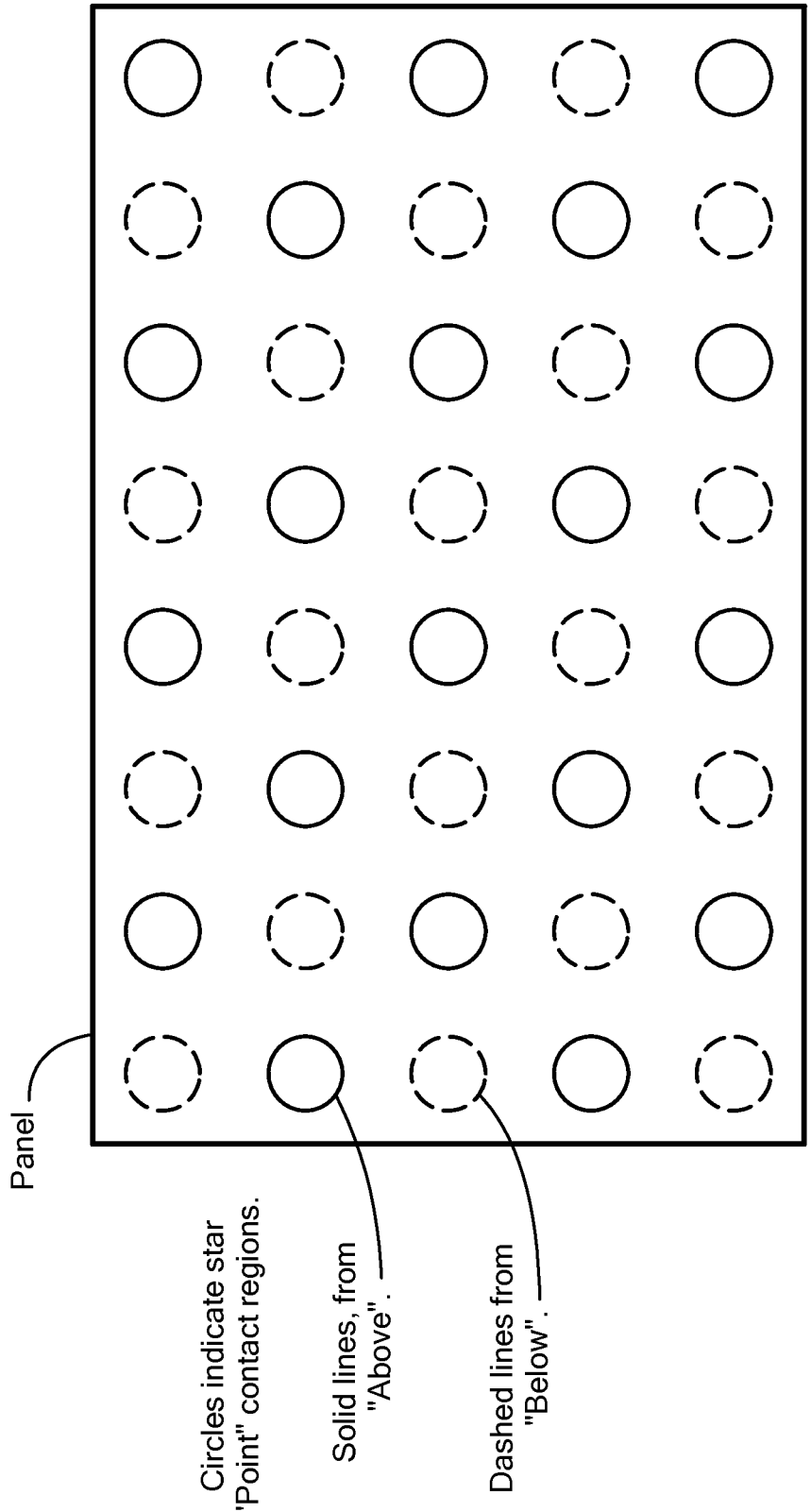
FIG. 18 is a schematic illustration of a contact pattern after processing a panel in an intermeshing star shaped former softening machine.

The rotation of the stars can be phase-locked by gears or another mechanism, so that the points and valleys always line up. Note that the phasing of adjacent stars (i.e. stars next to one another along the "Y" direction) can be such that they form a "spiral" pattern along their respective mounting shafts; and this happens while all opposing stars still remain phase locked with points to valleys as they rotate. Other star phase patterns along the "Y" direction are possible; FIG. 15, for example, illustrates a configuration in which the stars are spiraled with a phase angle of 15° (half of the point spacing, i.e., 360°/12 stars/2) along their respective axes. As a visual aid to this particular configuration, consider the points where the stars contact the panel from above and below, as shown in the pattern in FIG. 18.

Figure 19:
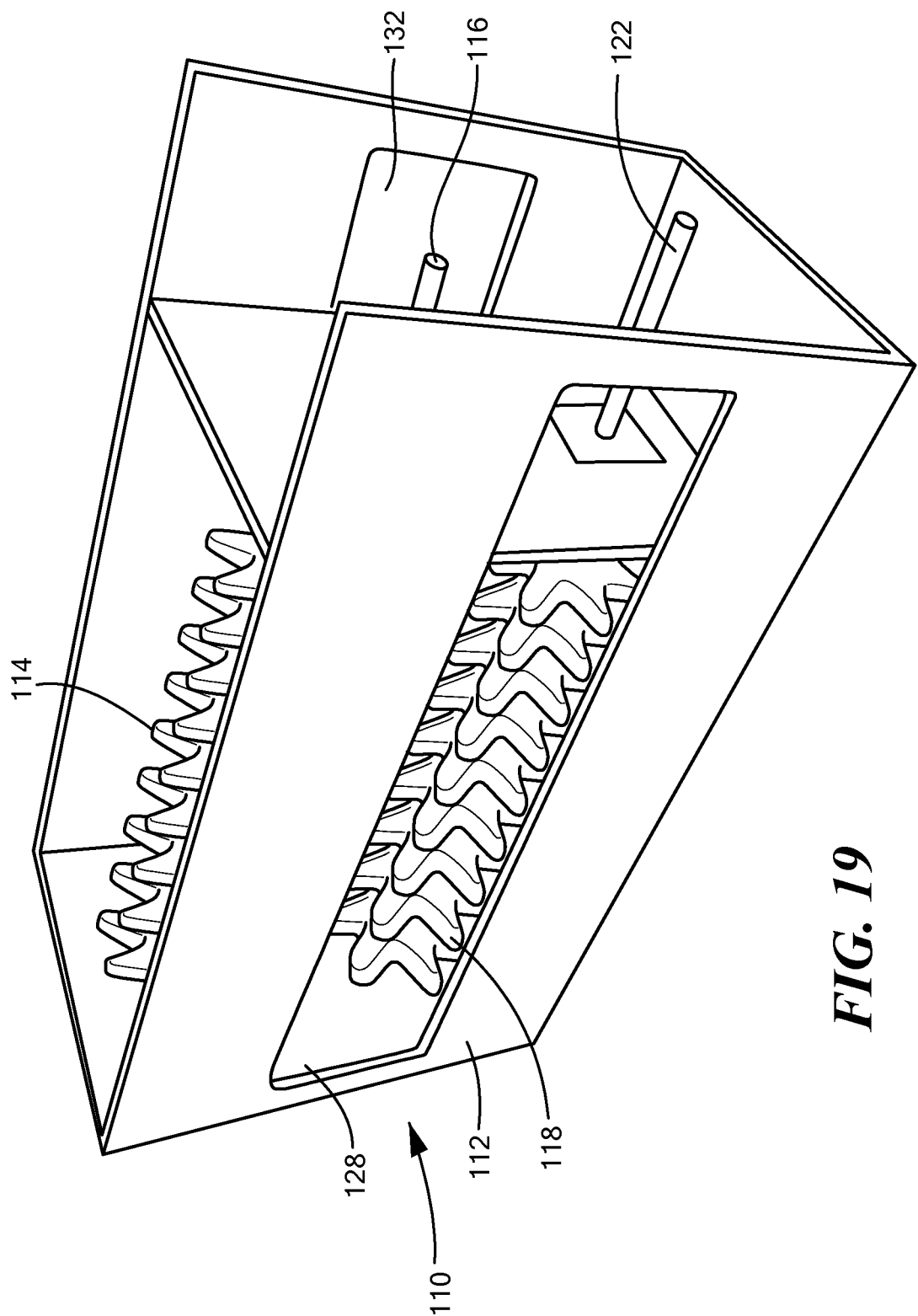
FIG. 19 is a front view of an embodiment of an intermeshing star shaped forming machine for use in forming a softened panel.
Figure 20:
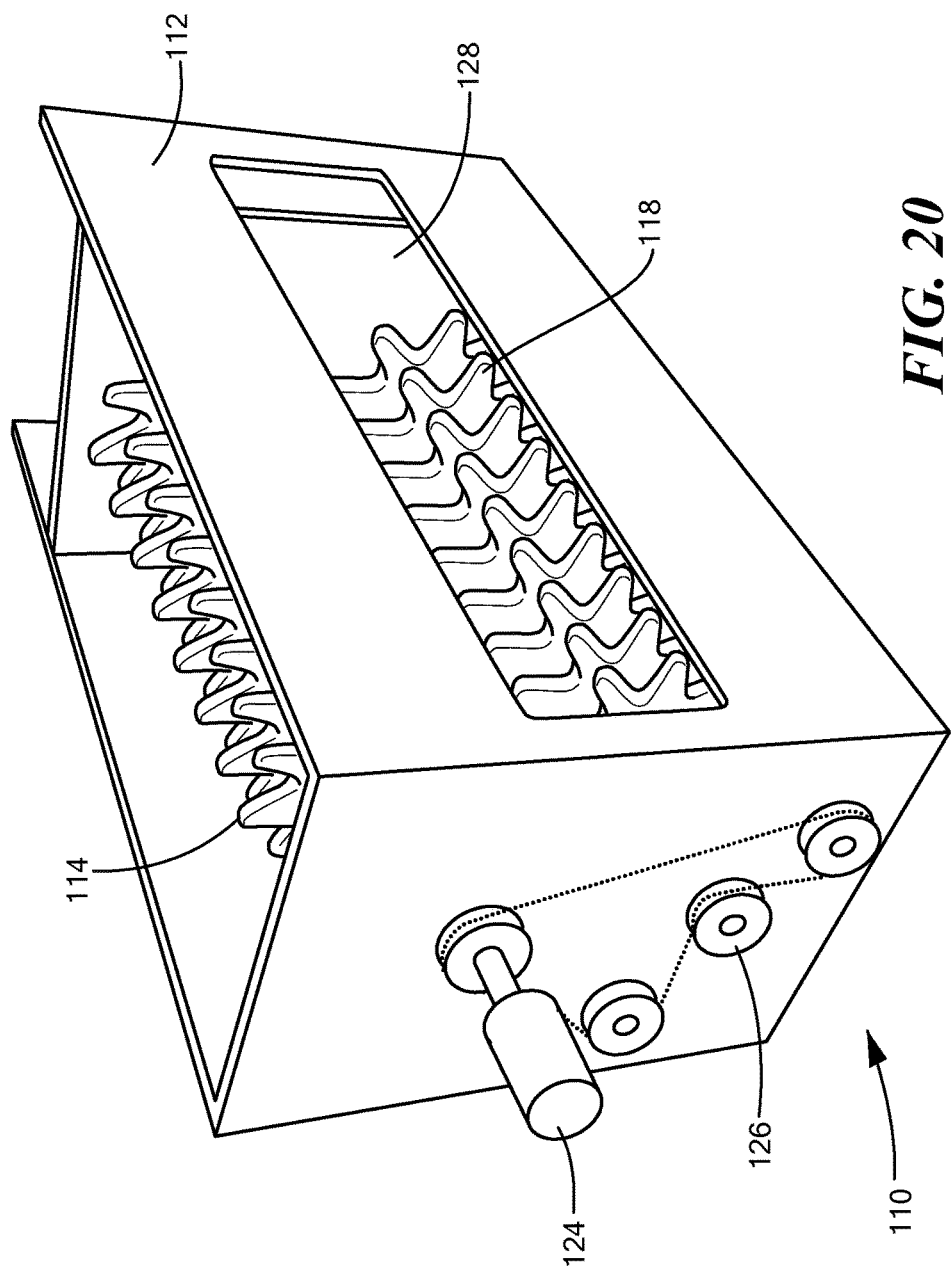
FIG. 20 is a rear view of the forming machine of FIG. 19.
Figure 21:
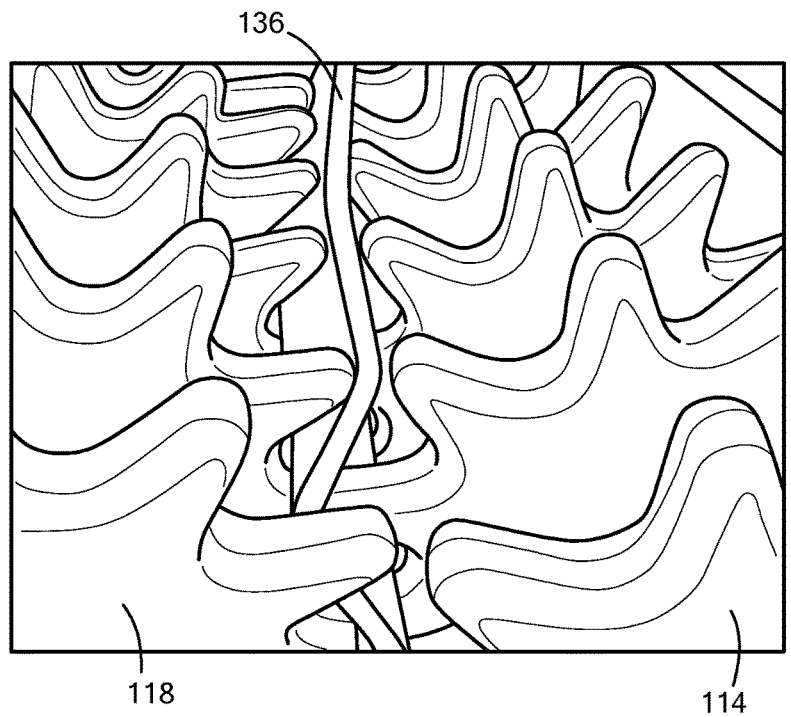
FIG. 21 is a detail view of an intermeshing region of the forming machine of FIG. 19.

One embodiment of an intermeshing star type softening machine 110 that has been fabricated is illustrated in FIGS. 19-21. The machine includes a housing 112, an upper row of star shaped formers 114 mounted for rotation on an upper rotatable shaft 116, and a lower row of star shaped formers 118 mounted for rotation about a lower rotatable shaft 122. The shafts are supported on suitable bearings at end walls of the housing. A motor 124 and suitable gearing 126 can be provided to effect coordinated rotation of the shafts. The motor and gearing can be operable to rotate the formers in two opposed directions, as noted above. The motor can be powered, for example, electrically, pneumatically, or manually, such as with a hand-operated crank. An entrance opening 128 in a front wall of the housing is provided for introducing a panel into the intermeshing region between the intermeshing formers. Similarly, an exit opening 132 in a back wall of the housing is provided for removing the panel after passing between the formers. FIG. 21 provides a view of a panel 136 within the intermeshing region between the star shaped formers of each row.

In some embodiments, a panel can be heated prior to or during feeding into a work softening machine to facilitate the softening mechanism(s). For example, a panel can be heated in a preheating oven to between 120 and 250° F. prior to introduction into a softening machine. In another example, a panel can be transferred from lamination equipment that heated the panel into a softening machine while the panel is still hot from the lamination equipment. In a further example, the softening machine can be heated, for example, in the region between the formers, or the formers can be heated. In some embodiments, a panel can be cooled to achieve different or unique disbond defects. Cooling can be accomplished via, for example, immersion in liquid nitrogen or another cryogenic medium.

The foregoing process descriptions are examples of how the work softening can be accomplished, and are not intended to show all possible methods for accomplishing this task. For example, the stars formers can have any number of points. Points of the stars can be rounded or otherwise shaped to produce the desired impingement. The formers can have other configurations, such as oval. The formers can be mounted for eccentric rotation.

By softening multiple ply groups together as a single lamination, manufacturing time can be reduced and ply groups can be indexed to minimize thickness (i.e., wrinkle to wrinkle fit). For example, a group of ply groups softened together at one time can be half the thickness of the ply groups stacked after softening the ply groups individually. It will be appreciated that single ply groups or subsets of ply groups can be work softened separately if desired and subsequently stacked together.

Figure 22:
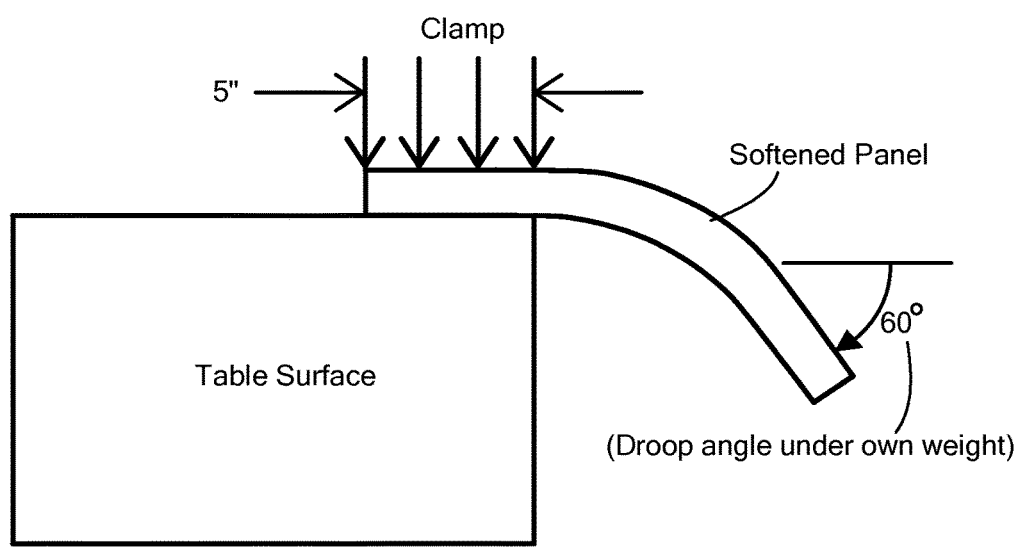
FIG. 22 is a schematic illustration of a softness droop test.
Figure 23:
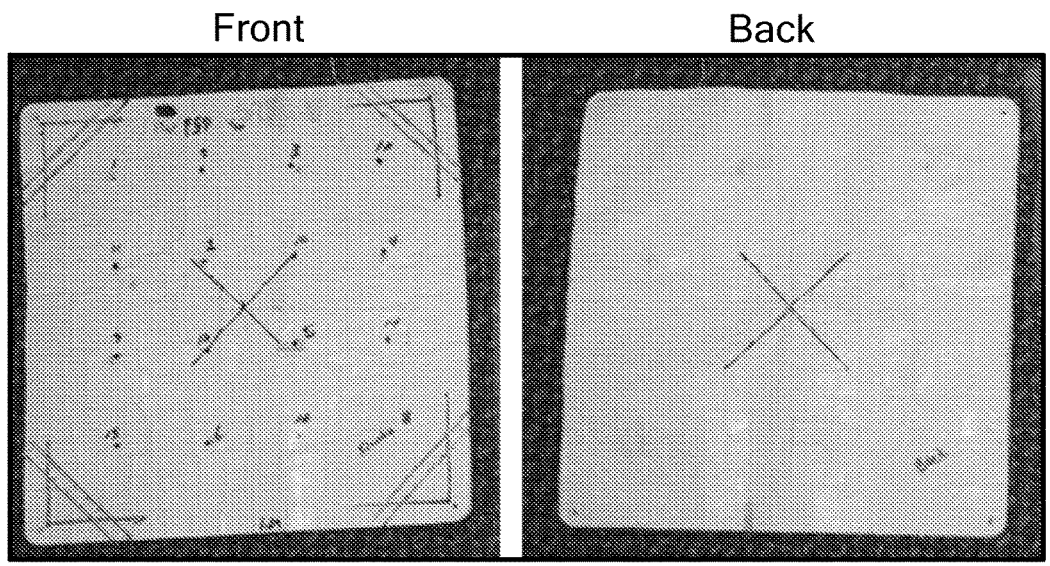
FIG. 23 illustrates the front and back of a 15"×15" shootpack after 17-grain FSP testing.
Figure 24:
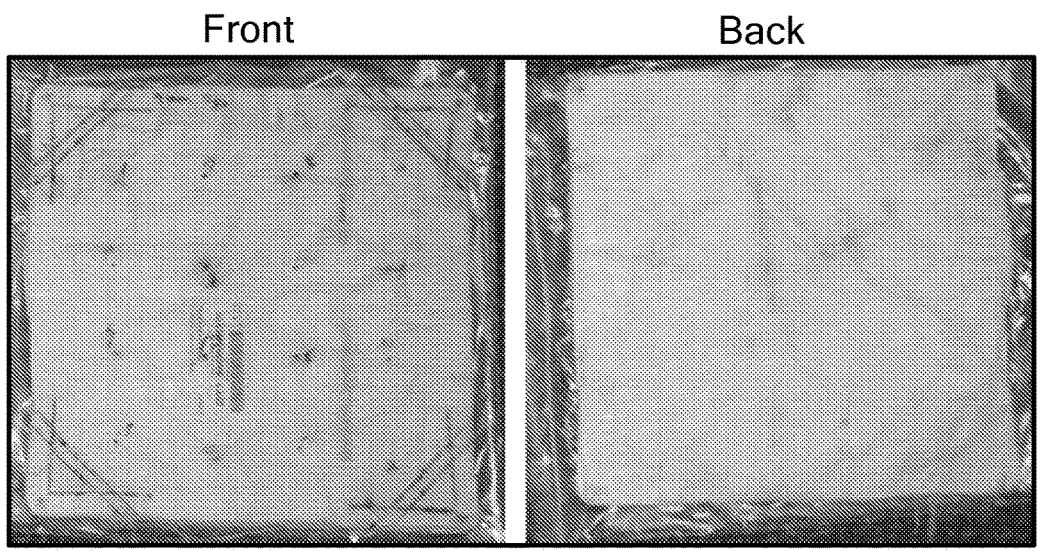
FIG. 24 illustrates the front and back of a 15"×15" shootpack after JP-8 conditioning and 9 mm FMJ testing.
Figure 25:
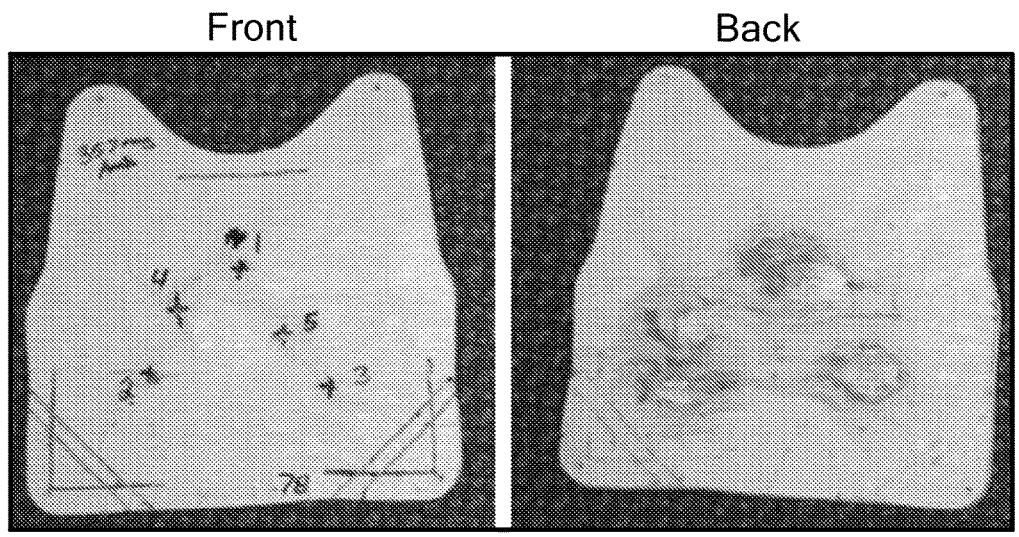
FIG. 25 illustrates the front and back of an NIJ-C-1 smallest panel after 0.357-Mag testing.
Figure 26:
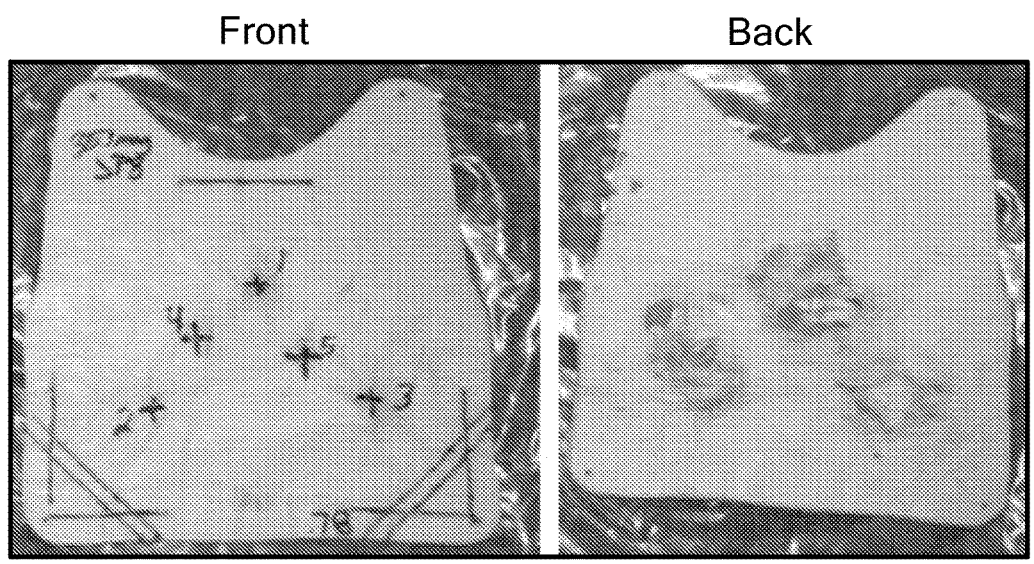
FIG. 26 illustrates the front and back of an NIJ-C-1 smallest panel after JP-8 conditioning and 0.357-Mag testing.
Figure 27:
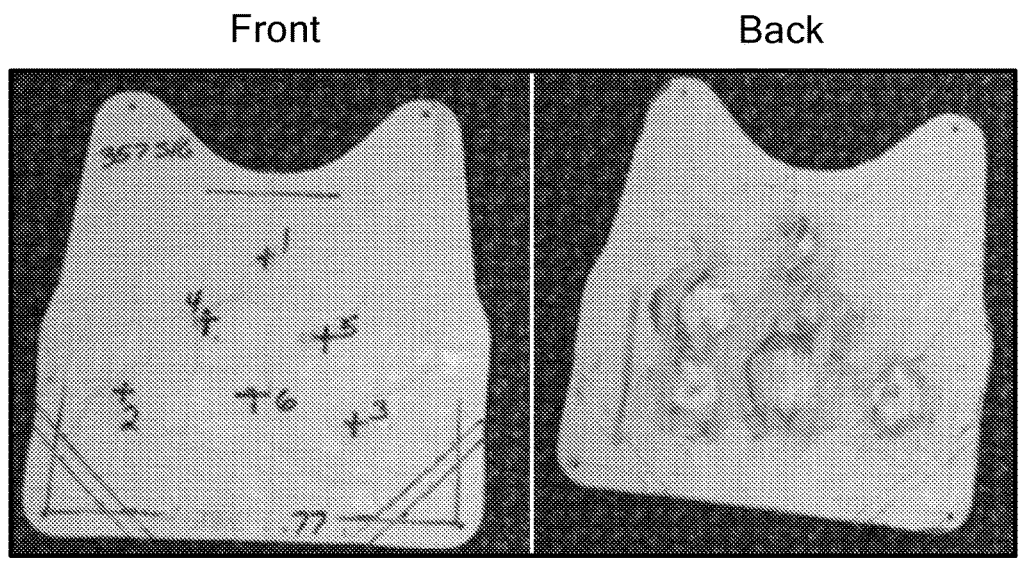
FIG. 27 illustrates the front and back of an NIJ-C-1 smallest panel after 0.357-Sig testing.
Figure 28:
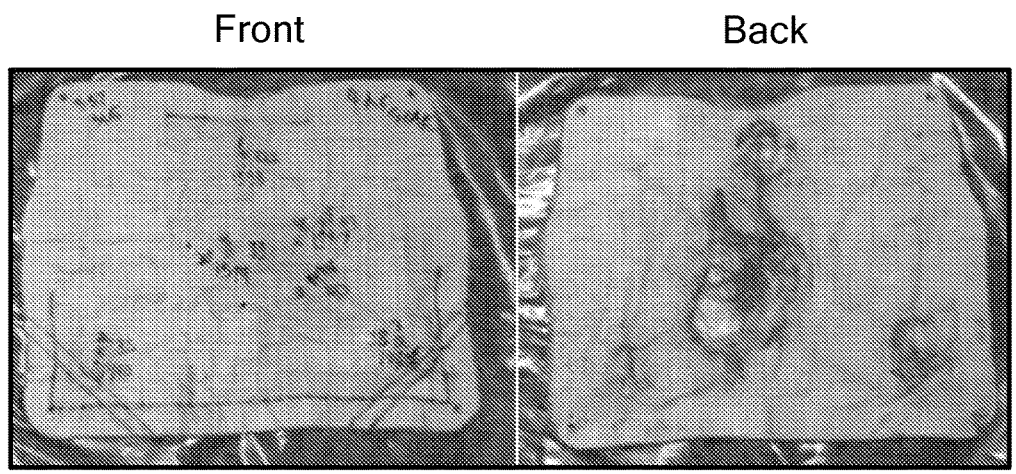
FIG. 28 illustrates the front and back of an NIJ-C-1 smallest panel after JP-8 conditioning and 0.357-Sig testing.

The softening process is performed until the panel reaches a desired degree of compliance. Compliance can be measured a variety of ways. In one embodiment, compliance is measured using a fabric droop test. Referring to FIG. 22, a portion of a panel, such as ⅓ of the panel, is clamped to a horizontal surface, and a remainder of the panel extends past an edge of the horizontal surface. The angle of droop from horizontal of the remainder portion of the panel is measured. In some embodiments, a panel can be softened until it reaches a droop angle of at least 20°. In other embodiments, the droop angle is at least 30°, at least 40°, at least 50°, at least 60°, or at least 70°. Another test method for the stiffness of fabrics is ASTM D1388-14, which be used for some embodiments.

Another test method can be used to determine the flexibility of soft armor ballistic panels using a compressive tensile apparatus that meets the requirements of ASTM E4-13 and ASTM E4-08. A 1-inch diameter ball plunger conforming to ASTM D3787-07(2011) is pressed into a 15-inch×15-inch test panel for 2 inches at a constant rate of 10 inches per minute into a circular cavity (5-inch diameter with a 0.5 inch edge radius) and the deflection measured. The stiffness is determined by the force applied to the panel at a deflection of 2 inches. Both sides of the panel can be tested in this manner for a number of times, such as 10 times each side. A specification for determining flexibility using this test method can be found in the U.S. Army's Solider Protection System program, in PED-IOP-008.

In some embodiments, a panel is softened to the point at which the softness test load is less than 75 lbs. as determined by the Ball Plunger test (PED-IOP-008). The test result is an average of the last 3 of 20 load measurements after testing in the same location and alternating the deformation direction after each measurement by flipping the test article.

A flocking process can be used to introduce short fibers into a panel. Flocked fiber can be used as an inter-layer treatment between selected prepreg layers during the panel assembly process. The selected positions for the flocked fiber could be at one or more layer interfaces in a ply group, including at every layer interface. Depending on the fiber type, fiber length, and flocking density (measured in grams per square meter), the flocked fibers can provide: 1) an inter-layer toughening region, thus resisting delamination, 2) an inter-layer weak region, promoting delamination, but resulting in flocked fibers traversing across the interface and holding the layers together, or 3) an inter-layer weak region promoting complete de-coupling of the layers (similar to the action of a release ply).

The flocked fiber process is useful in between UHMWPE prepreg layers, using the resin already in the prepreg to bond to the flocked fiber. The flocked fiber could also be used in combination with an adhesive layer at selected layer interfaces.

The flocking process in general moves short fibers (such as, polyester, nylon, and others) to a surface, where the surface is usually covered with a material, such as an adhesive or a resin, as in the panels described above, to bond the fibers to the surface. Flocking fibers generally range from 0.5 mm to 10 mm in length, although shorter and longer lengths are possible. In one flocking process, the fibers can be negatively charged, and the substrate grounded, so the fibers tend to move to the grounded substrate. This is often referred to as "electrostatic" flocking. In addition, the negatively charged fibers tend to repel one another, resulting in a majority of fibers reaching the surface at an angle near perpendicular to the surface, and with the fibers nearly parallel to one another. Other flocking processes, such as vibration processes and spraying processes, can be used. The flocking fibers can be formed from any of the fiber materials used in the prepreg. Flocking fiber can be the same as or different from the fibers in the adjacent layers.

Soft armor panels formed according to the various processes described herein can be used for a variety of articles and purposes. In some embodiments, a soft panel can be used for body armor, such as body vests, jackets, helmets, sports helmets, hats, face shields, face masks, ear pads or coverings, mouth guards, throat protectors, chin straps, jaw pads, eye shields, elbow pads, pants, leg guards, shin guards, knee pads, foot guards, boots, shoes, fencing garments, and other articles of clothing. Other applications include use as inserts, for example, in vests, jackets, and back packs.

In other embodiments, a soft armor panel can be used for an armored article that has a non-planar contour. For example, in one embodiment, a vehicular armor system can incorporate a soft armor panel to provide protection against ballistic projectiles fired at a vehicle, particularly a vehicle door. Such a vehicular armor system can be used to retrofit a vehicle to prevent ballistic projectiles from penetrating the vehicle. The armor system comprises a panel sized to cover at least a portion of an exterior vehicular surface, particularly the door, which has a contoured or non-planar exterior surface. The panel has a non-planar contour configured to generally conform to the non-planar contour of the vehicular surface. The panel comprises a layered arrangement of materials that includes a protection layer and an outer surface or cosmetic layer. The protection layer can be or include a soft panel as described herein, which can be easily shaped to conform to any contour of the vehicle door. A rigid ballistic layer can also be provided if desired, such that the soft armor panel can act as a catcher layer behind the rigid layer. The cosmetic layer arranged on the outer side of the protection layer can include color, graphic matter, or both visible on the outer surface of the panel, so that the armor system can blend in with the rest of the vehicle. The cosmetic layer can be an automotive grade vinyl material. A removable mounting system can be used to affix the panel to the vehicular surface. For example, the panel can be affixed to a vehicle door with screws, rivets, or the like. Such a vehicular armor system can be installed rapidly on a vehicle exterior and does not require dismantling of the vehicle.

In other embodiments, a soft armor panel can be used to provide armoring in a contoured or confined space. Such confined spaces can include, for example, the region beneath the floor boards in a vehicle to provide protection against explosive devices beneath the vehicle. Another confined space is the region within an engine nacelle. A soft armor panel can be readily configured to fit within this region to provide protection against both outside threats from ballistic projectiles and against fragments from a failure of the rotating turbine blades or other components within the engine that could otherwise penetrate through the nacelle.

In any such embodiments, the soft armor panel can be used alone or in combination with rigid armor panels.

Ballistic testing was carried out to test the ballistic performance of the softened panels with slip planes. The NIJ 3a test protocol requires test panels for body armor to pass two primary tests, 1) a penetration resistance test referred to as the V50 requirement, and 2) a maximum allowable deformation test referred to as the "Back Side Deflection" (BSD) requirement. Panels must pass both tests in order to meet the protocol.

The V50 test supports the test panel at the edges, and subjects it to multiple shots with a specific projectile at various velocities, until the V50 velocity for that panel is obtained for that projectile. The V50 velocity is a theoretical statistical value where, if all projectiles were traveling at that velocity, approximately 50% of projectiles will penetrate the panel and 50% will not. Each particular penetration failure is noted when the projectile penetrates the panel and damages a witness plate, usually a thin aluminum sheet, hung behind the panel at a particular distance. The V50 velocity is required to meet a certain minimum value for each of the required threats.

The Back Side Deflection (BSD) test supports the panel from behind on a clay foundation and subjects the panel to multiple shots (e.g. a test pattern) with each threat in question, at their respective velocities. The depth of penetration of the panel into the clay is measured after each shot, and the clay is reformed and returned to its original flat state. Generally speaking, the BSD cannot exceed a statistical value (e.g. average+one standard deviation) based on the multiple shot protocol.

In addition, the "Soldier Protection System" (SPS) protocol (referred to as the "Technical Statement of Need, for the Soldier Protection System, and for the Torso Protection System"), requires V50 resistance to a variety of fragments in addition to standard threats such as 45 Magnum, and 357 SIG rounds, since fragments are a significant component of blast events. These fragment tests are often the weakness in a panel that passes all other tests. Standard ballistic testing fragments include right circular cylinders (RCCs) and fragment simulating projectiles (FSPs). Standard RCC sizes include 2 grain, 4 grain, 16 grain, and 64 grain, and standard FSP sizes include 17 grain (22 caliber).

Example 1

The testing showed that the ballistic performance of the softened panels was not reduced significantly below that of the un-softened rigid panels. The softened panels showed significantly higher ballistic performance compared to traditional soft body armor.

Six panels were fabricated from DYNEEMA® HB-212 (unidirectional cross-plied material, based on UHMWPE fibers) for testing under the NIJ Standard-0101.06 ballistic protocol (https://www.ncjrs.gov/pdffiles1/nij/223054.pdf). Three panels were tested as rigid panels, and three panels were work softened according to the invention. The panels were square, 15 inches on each side, and weighed approximately 1.28 pounds each, giving a weight per unit area of 0.82 pounds per square foot. The panels had a thickness of about 0.25 inch.

The panels were softened by passing through the machine shown in FIG. 15, at various angles (0°, 45°, −45°, and 90°) as shown in FIG. 12A-12D, with approximately 30 passes each. The softness was such that the softened panels easily conformed to the human chest form required. In addition, to quantify the softness more accurately, a droop test was used as shown in FIG. 22, where ⅓ of the panel was clamped to a table and the droop angle measured. Panels were softened until they reached a threshold droop angle of 60°.

The data are shown in Tables 1 and 2 below.

Sample #1 in each case was the V50 test, in which the projectile velocity is determined where 50% of the projectiles are stopped and 50% are not stopped sufficiently to meet the protocol. Both the rigid and softened panels passed this test.

Samples #2 and #3 in each case were repeats of the V0 test, where no penetration is tolerated and the deflection must also be below that required in the protocol. All panels passed this test.

TABLE 1

Rigid Panel of DYNEEMA ® HB-212

| Sample No. | Length × Width (inches) | Weight (lbs) | Threat | Target Obliquity | Shot No. | Result | Deformation (mm) |
|---|---|---|---|---|---|---|---|
| 1 | 15 × 15 | 1.28 | .44 mag V50 | 0° | N/A | 1803 | N/A |
| 2 | 15 × 15 | 1.28 | .44 mag V0 | 0° | 1 | Pass | 28 |
|   |         |      |            | 0° | 2 | Pass | 39 |
|   |         |      |            | 0° | 3 | Pass | 40 |
|   |         |      |            | 30° | 4 | Pass | 32 |
|   |         |      |            | 45° | 5 | Pass | 24 |
|   |         |      |            | 0° | 6 | Pass | 38 |
| 3 | 15 × 15 | 1.28 | .44 mag V0 | 0° | 1 | Pass | 24 |
|   |         |      |            | 0° | 2 | Pass | 36 |
|   |         |      |            | 0° | 3 | Pass | 45 |
|   |         |      |            | 30° | 4 | Pass | 33 |
|   |         |      |            | 45° | 5 | Pass | 31 |
|   |         |      |            | 0° | 6 | Pass | 33 |
|   |         |      |            |     |   | Average | 33.6 |
|   |         |      |            |     |   | Standard Deviation | 6.4 |

TABLE 2

Softened Panel of DYNEEMA ® HB-212

| Sample No. | Length × Width (inches) | Weight (lbs) | Threat | Target Obliquity | Shot No. | Result | Deformation (mm) |
|---|---|---|---|---|---|---|---|
| 1 | 15 × 15 | 1.28 | .44 mag V50 | 0° | N/A | 1593 | N/A |
| 2 | 15 × 15 | 1.28 | .44 mag V0 | 0° | 1 | Pass | 39 |
|   |         |      |             | 0° | 2 | Pass | 39 |
|   |         |      |             | 0° | 3 | Pass | 38 |
|   |         |      |             | 30° | 4 | Pass | 32 |
|   |         |      |             | 45° | 5 | Pass | 30 |
|   |         |      |             | 0° | 6 | Pass | 39 |
| 3 | 15 × 15 | 1.28 | .44 mag V0 | 0° | 1 | Pass | 38 |
|   |         |      |             | 0° | 2 | Pass | 45 |
|   |         |      |             | 0° | 3 | Pass | 46 |
|   |         |      |             | 30° | 4 | Pass | 31 |
|   |         |      |             | 45° | 5 | Pass | 30 |
|   |         |      |             | 0° | 6 | Pass | 41 |
|   |         |      |             |    |   | Average | 37.3 |
|   |         |      |             |    |   | Standard Deviation | 5.5 |

Microscopic examination of work softened panels reveals that small disbond and delamination defects are introduced between the fibers and between layers, and not in the fibers themselves. Surprisingly, it was seen that ballistic performance of the softened panel does not deteriorate over the rigid panel.

Example 2

Several sample panels were manufactured in a configuration of several packets of material that included a total of nineteen plies of UHMWPE and two plies of other laminates, such as UHMWPE felt. In these samples, the panels had an areal density of 0.766 psf, and an average flexibility of 70.85 lbf determined by the Ball Plunger test as specified in PED-IOP-008. Each panel was tested as manufactured and after conditioning with jet fuel JP-8 for 4 hours. Table 3 below provides a summary of the ballistic $V_{50}$ and $V_0$ testing of these panels.

TABLE 3

| Threat | Test Type | Panel Size | Requirement | Result |
|---|---|---|---|---|
| 17-grain FSP | $V_{50}$ | 15" × 15" Shootpack | $V_{50}$ = 1850 fps | PASS $V_{50}$ = 1856 FPS |
| 9 mm FMJ | $V_{50}$ Conditioned in JP-8 (4 hours) | 15" × 15" Shootpack | $V_{50}$ = 1525 fps | PASS $V_{50}$ - 1838 fps |
| .357-Mag | $V_0$ | NIJ-C-1 Smallest | $V_0$ = 1430 ± 30 fps with 44 mm Max Deformation | PASS No penetration with max deformation = 40.837 mm |
| .357-Mag | $V_0$ Conditioned in JP-8 (4 hours) | NIJ-C-1 Smallest | $V_0$ = 1430 ± 30 fps with 44 mm Max Deformation | PASS No penetration with max deformation = 35.986 mm |
| .357-Sig | $V_0$ | NIJ-C-1 Smallest | $V_0$ = 1470 ± 30 fps with 44 mm Max Deformation | PASS No penetration with max deformation = 32.933 mm |
| .357-Sig | $V_0$ Conditioned in JP-8 (4 hours) | NIJ-C-1 Smallest | $V_0$ = 1470 ± 30 fps with 44 mm Max Deformation | PASS No penetration with max deformation = 38 mm |

FIGS. 23 to 28 show photographs of the front and back of each of the panels that underwent the testing described in Table 3.

Example 3

Test panels of several ply groups, with slip planes between each ply group, were fabricated and subjected to fragment resistance testing. The following arrangement of ply groups, with and without the fourth ply group comprising a UHMWPE felt layer, were laminated and work softened:

TABLE 4

| Ply Group | Material | Number of Plies | Areal density (pounds per square ft (psf)) |
|---|---|---|---|
| 1 | HB212 Dyneema ® | 8 | approximately 0.231 psf) |
| 2 | HB50 Dyneema ® | 5 | approximately 0.247 pfs |
| 3 | HB212 Dyneema ® | 8 | approximately 0.231 psf |
| 4 | Dyneema ® Felt | 2 | approximately 0.076 psf |

V50 test results are as follows:

TABLE 5

| Fragment | V50 Requirement | V50 Without Felt Layer (0.789 psf) | V50 With Felt Layer (0.865 psf) |
|---|---|---|---|
| 2 grain RCC | 2710 | 2674 | 2886 |
| 4 grain RCC | 2400 | 2422 | 2667 |

TABLE 5-continued

| Fragment | V50 Requirement | V50 Without Felt Layer (0.789 psf) | V50 With Felt Layer (0.865 psf) |
|---|---|---|---|
| 16 grain RCC | 2050 | 2031 | 2243 |
| 17 grain FSP | 1850 | 1873 | 2025 |

These results illustrate that the addition of the felt layer on the back face enabled the panel to pass the V50 fragment testing at all fragment sizes.

The panel was also subjected to backside deflection (BSD) testing. FIG. 29 illustrates instances in which the felt layer of the test panel entrapped and stopped fragments. FIGS. 30A, 30B, and 30C further illustrate fragments caught in the felt layer of the test panel. (The test panels in FIGS. 30A-C include a nylon fabric covering over the back side of the test panel.)

Example 4

Another test panel was prepared by lamination and work softening and subjected to backside deflection (BSD) testing. The test panel had the following arrangement of ply groups, including a dry felt ply group, or effector ply, on the front or strike face of the panel. Another test panel omitted the first felt ply group.

TABLE 6

| Ply Group | Material | Number of Plies | Fiber Orientation | Areal density (pounds per square ft (psf)) |
|---|---|---|---|---|
| 1 | Dyneema ® Felt | 2 | | approximately 0.076 psf |
| 2 | HB212 Dyneema ® | 8 | 0°/90° | approximately 0.231 psf) |
| 3 | PE Foam, 1/8" | 1 | | |
| 4 | HB50 Dyneema ® | 5 | ±45° | approximately 0.247 pfs |
| 5 | HB50 Dyneema ® | 5 | 0°/90° | approximately 0.247 psf |

The ±45° fiber orientation of ply group 4 relative to the 0°/90° fiber orientation of surrounding ply groups 2 and 5 reduced scatter in the BSD results, resulting in improved performance.

Figures 31, 32:
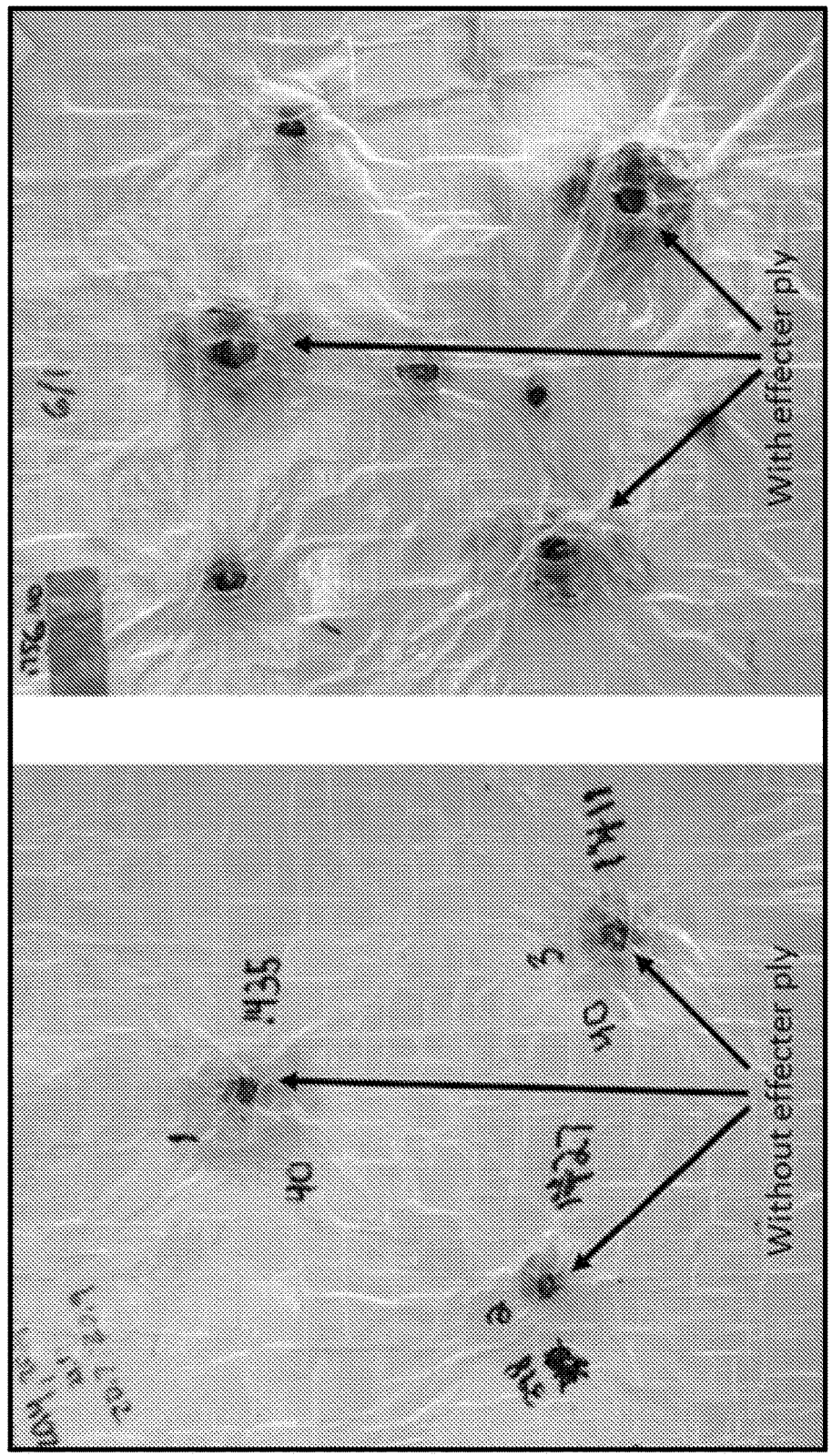
FIG. 31 illustrates three shots to a test panel without an effector ply on the front face.
FIG. 32 illustrates three shots to a test panel with an effector ply on the front face.

Additionally, FIGS. 31 and 32 show the strike face of a panel shot three times, both with (FIG. 32) and without (FIG. 31) the dry felt ply group, the effector ply. The bullet deformation, evidenced by the dark area under the surface layer of ply group 2, is much larger for the shots with the felt ply group on the strike face. The felt ply group effectively improved stopping the bullet.

Example 5

The following layers, including three ply groups, were assembled and laminated:
1. Release-Ply of silicone-coated paper;
2. HDPE film, 0.31 mil (0.00031 inches thick), 0.0017 psf;
3. 8 layers of HB212 DYNEEMA® in a 0°/90° orientation;
4. HDPE film, 0.31 mil thick, 0.0017 psf;
5. Release-Ply of silicone-coated paper also coated on both sides with graphene ink (<1 wt. % of a ply group) as a slip agent;
6. HDPE film, 0.31 mil, 0.0017 psf;
7. 5 layers of HB50 DYNEEMA® in a ±45° orientation;
8. HDPE film, 0.31 mil, 0.0017 psf;
9. Release-Ply of silicone-coated paper also coated on both sides with graphene ink (<1 wt. % of a ply group) as a slip agent;
10. HDPE film, 0.31 mil, 0.0017 psf;
11. 8 layers of HB212 DYNEEMA® in a 0°/90° configuration;
12. HDPE film, 0.31 mil, 0.0017 psf; and
13. Release-Ply of silicone-coated paper.

After lamination, the silicone-coated paper of the release plies of layers 1, 5, 9, and 13 were removed. The resulting panel was work softened. A backing layer of felt was added adjacent layer 12. A ballistic-resistant vest made from this assembly is suitable for typical military applications, including fragment protection.

Example 6

The following layers, including four ply groups, were assembled (starting with the back side (layer 1) and moving forward) and laminated:
1. Release-Ply of silicone-coated paper;
2. HDPE film, 0.31 mil (0.00031 inches thick), 0.0017 psf;
3. 3 layers of HB212 DYNEEMA® in a 0°/90° orientation;
4. HDPE film, 0.31 mil, 0.0017 psf;
5. Release-Ply of silicone-coated paper also coated on both sides with graphene ink (<1 wt. % of a ply group) as a slip agent;
6. HDPE film, 0.31 mil, 0.0017 psf;
7. 6 layers of HB212 DYNEEMA® in a 0°/90° orientation;
8. HDPE film, 0.31 mil, 0.0017 psf;
9. Release-Ply of silicone-coated paper also coated on both sides with graphene ink (<1 wt. % of a ply group) as a slip agent;
10. HDPE film, 0.31 mil, 0.0017 psf;
11. 7 layers of HB50 DYNEEMA® in a ±45° orientation;
12. HDPE film, 0.31 mil, 0.0017 psf;
13. Release-Ply of silicone-coated paper also coated on both sides with graphene ink (<1 wt. % of a ply group) as a slip agent;
14. HDPE film, 0.31 mil, 0.0017 psf;
15. 7 layers of HB212 DYNEEMA® in a 0°/90° configuration;
16. HDPE film, 0.31 mil, 0.0017 psf; and
17. Release-Ply of silicone-coated paper.

After lamination, the silicone-coated release plies of layers 1, 5, 9, 13 and 17 were removed. The resulting panel was work softened by ten passes through the work softening machine described with reference to FIGS. 19-21. A ballistic vest made from this assembly, with the strike face at layers 15 and 16, is suitable for typical law enforcement applications.

It will be appreciated that the various features of the embodiments described herein can be combined in a variety of ways. For example, a feature described in conjunction with one embodiment may be included in another embodiment even if not explicitly described in conjunction with that embodiment.

The present invention has been described with reference to the preferred embodiments. It is to be understood that the invention is not limited to the exact details of construction, operation, exact materials or embodiments shown and described, as obvious modifications and equivalents will be apparent to one skilled in the art. It is believed that modifications and alterations to the embodiments disclosed will readily suggest themselves to those skilled in the art upon reading and understanding the detailed description of the invention. It is intended to include all such modifications and alterations insofar as they come within the scope of the present invention.

What is claimed is:

1. A soft panel for ballistic resistant armor, comprising:
a work softened lamination comprising a plurality of ply groups, each ply group comprising one or more layers, each layer comprising a composite material comprising fibers embedded in a matrix material, wherein the fibers comprise polyethylene fibers, aramid fibers, glass fibers, liquid crystal fibers, or polybenzoxazole fibers, and the matrix material comprises a thermosetting resin, a thermoplastic resin, a thermosetting rubber, or a thermoplastic rubber;
the work softened lamination including a plurality of defects within at least a portion of the ply groups and including shear deformations in a plane defined by X and Y directions of the layers of the ply groups formed by applying a mechanical stress or mechanical strain to the lamination by feeding the lamination through a work softening apparatus with the fibers oriented at ±45° to a feed direction; and
a slip plane between at least one set of adjacent ply groups, the adjacent ply groups remaining unconnected or substantially unconnected at the slip plane.

2. The soft panel of claim 1, wherein the slip plane comprises a slip agent between the adjacent ply groups.

3. The soft panel of claim 2, wherein the slip agent comprises graphene.

4. The soft panel of claim 1, wherein the slip plane comprises graphene particles, graphene-based ink, ceramic particles, metal particles, a plastic film, a metallic film, paper, or a combination thereof.

5. The soft panel of claim 1, wherein the slip plane comprises a silicone-coated paper or a silicone-coated film.

6. The soft panel of claim 1, wherein the slip plane comprises a film of polyolefin, including polypropylene, high density polyethylene or polyethylene terephthalate.

7. The soft panel of claim 1, wherein the slip plane forms a discontinuity within the lamination, the discontinuity formed by two resins disposed in adjacent ply groups, wherein the two resins do not bond with each other, or by a change in angle of orientation of the fibers between adjacent ply groups.

8. The soft panel of claim 1, wherein the adjacent ply groups are held together at the slip plane during normal use and move in shear relative to one another along the slip plan during a ballistic event.

9. The soft panel of claim 1, wherein the slip plane further includes an adhesive material or a fastening mechanism to hold the adjacent ply groups together during normal use and allow movement of the adjacent ply groups in shear relative to one another along the slip plane during a ballistic event.

10. The soft panel of claim 1, wherein the defects comprise one or more of disbond defects and delamination defects between the fibers within the ply group.

11. The soft panel of claim 1, further comprising a felt layer disposed on a back face of the lamination.

12. The soft panel of claim 1, further comprising a felt layer disposed as a strike face adjacent to a first ply group.

13. The soft panel of claim 1, further comprising a layer of foam adjacent to one of the plurality of ply groups.

14. The soft panel of claim 1, wherein each layer within at least a portion of the ply groups comprises a prepreg material comprising one or more plies of the fibers pre-impregnated with the matrix material.

15. The soft panel of claim 1, wherein in a ply group, the fibers within the layers are unidirectionally aligned and the fiber direction in adjacent layers are cross-plied at an angle ranging from more than 0° to 90°.

16. The soft panel of claim 1, wherein the fibers in at least one of the layers are unidirectionally oriented.

17. The soft panel of claim 1, wherein the fibers in at least one of the layers are oriented at different angles.

18. The soft panel of claim 1, wherein at least some of the layers of each ply group comprise one of a woven material, a non-woven material, a unidirectional material, a knit material, or a felt material.

19. The soft panel of claim 1, wherein the composite material comprises ultra-high molecular weight polyethylene fibers in a urethane resin matrix.

20. The soft panel of claim 1, wherein a softness test load on the panel is less than 75 lbs. as determined by a Ball Plunger test.

21. The soft panel of claim 1, further comprising an enclosure surrounding the work softened lamination.

22. The soft panel of claim 1, wherein the work softened lamination has a contoured configuration.

23. The soft panel of claim 1, wherein the lamination comprises:
a first ply group comprising or adjacent to a strike face, wherein the layers of the first ply group are cross-plied at right angles and oriented in a 0°/90° configuration;
a second ply group, wherein the layers of the second ply group are cross-plied at right angles and oriented in a +45°, −45° configuration with respect to the first ply group; and
a third ply group, wherein the layers of the third ply group are cross-plied at right angles and oriented in the 0°/90° configuration.

24. The soft panel of claim 1, wherein the work softened lamination passes one or more of:
a V50 test for 2 grain right circular cylinder fragments traveling at a velocity of 2710 ft/sec at an areal density of at most 0.8 lb/ft$^2$;
a V50 test for 4 grain right circular cylinder fragments traveling at a velocity of 2400 ft/sec at an areal density of at most 0.8 lb/ft$^2$;
a V50 test for 16 grain right circular cylinder fragments traveling at 2010 ft/sec at an areal density of at most 0.8 lb/ft$^2$; and
a V50 test for 17 grain fragment simulating projectiles traveling at 1850 ft/sec at an areal density of at most 0.8 lb/ft$^2$.

25. The soft panel of claim 1, wherein the work softened lamination at an areal density of at most 0.8 lb/ft$^2$ provides protection against at least a National Institute of Justice threat level IIA, at least a National Institute of Justice threat level II, at least a National Institute of Justice threat level IIIA, or at least a National Institute of Justice threat level III.

26. An armor panel article comprising the soft panel of claim 1.

27. The armor panel article of claim 26, wherein the armor panel article comprises a body armor panel.

28. A process of forming a soft panel for ballistic resistant armor, comprising:
providing a plurality of ply groups, each ply group comprising a plurality of layers of a composite material comprising fibers embedded in a matrix material, wherein the fibers comprise polyethylene fibers, aramid fibers, glass fibers, liquid crystal fibers, or polybenzoxazole fibers, and the matrix material comprises a thermosetting resin, a thermoplastic resin, a thermosetting rubber, or a thermoplastic rubber;

laminating the ply groups together into a panel with a slip plane between at least one set of adjacent ply groups, the adjacent ply groups remaining unconnected or substantially unconnected at the slip plane; and work softening the panel by applying a mechanical stress or mechanical strain to the panel to form a plurality of defects within at least a portion of the ply groups and shear deformations in a plane defined by X and Y directions of the layers of the ply groups, by feeding the panel on a feed path through a work softening apparatus including upper and lower formers mounted for rotation along the feed path with the fibers oriented at ±45° to a feed direction.

\* \* \* \* \*